(12) United States Patent
Hatakeyama

(10) Patent No.: US 8,539,332 B2
(45) Date of Patent: Sep. 17, 2013

(54) IMPORTING AN EXTERNAL SUBORDINATE DOCUMENT INTO A MASTER DOCUMENT, EDITING THE "SUBORDINATE" PORTION OF THE MASTER DOCUMENT AND UPDATING THE EXTERNAL SUBORDINATE DOCUMENT BY EXPORTING THE EDIT OF THE "SUBORDINATE" PORTION OF THE MASTER DOCUMENT TO THE EXTERNAL SUBORDINATE DOCUMENT

(75) Inventor: Yuki Hatakeyama, Tokyo (JP)

(73) Assignee: Canon Kabushiki Kaisha (JP)

( * ) Notice: Subject to any disclaimer, the term of this patent is extended or adjusted under 35 U.S.C. 154(b) by 583 days.

(21) Appl. No.: 12/432,210

(22) Filed: Apr. 29, 2009

(65) Prior Publication Data

US 2009/0276699 A1  Nov. 5, 2009

(30) Foreign Application Priority Data

May 2, 2008  (JP) ................................. 2008-120770

(51) Int. Cl.
*G06F 17/00* (2006.01)
*G06F 17/20* (2006.01)

(52) U.S. Cl.
USPC .......................................... 715/209; 715/208

(58) Field of Classification Search
USPC ................................................. 715/209, 208
See application file for complete search history.

(56) References Cited

U.S. PATENT DOCUMENTS

| | | | |
|---|---|---|---|
| 6,772,165 B2* | 8/2004 | O'Carroll ............................. 1/1 |
| 7,161,711 B2 | 1/2007 | Mori et al. |
| 7,519,956 B2* | 4/2009 | Fukuda et al. ................. 717/125 |
| 7,581,176 B2* | 8/2009 | Wilson ........................... 715/243 |
| 7,606,823 B2* | 10/2009 | Kusakabe et al. ..................... 1/1 |
| 7,730,394 B2* | 6/2010 | Davis et al. .................... 715/235 |
| 2002/0194205 A1* | 12/2002 | Brown et al. ................. 707/200 |
| 2004/0111675 A1* | 6/2004 | Mori et al. .................... 715/513 |
| 2005/0094208 A1* | 5/2005 | Mori ............................ 358/1.18 |
| 2005/0216825 A1* | 9/2005 | Teague ....................... 715/501.1 |
| 2006/0069983 A1* | 3/2006 | Bailey et al. ............... 715/501.1 |
| 2006/0075338 A1* | 4/2006 | Kusakabe et al. ............. 715/530 |
| 2006/0143559 A1* | 6/2006 | Spielberg et al. ............. 715/512 |
| 2006/0156220 A1* | 7/2006 | Dreystadt et al. .......... 715/501.1 |
| 2006/0195783 A1* | 8/2006 | Davis et al. .................... 715/513 |

(Continued)

FOREIGN PATENT DOCUMENTS

| | | |
|---|---|---|
| JP | 6-96077 A | 4/1994 |
| JP | 2000-357074 A | 12/2000 |

(Continued)

OTHER PUBLICATIONS

JP Office Action issued Mar. 11, 2013 for corres. JP 2008-120770.

*Primary Examiner* — Doug Hutton
*Assistant Examiner* — Soumya Dasgupta
(74) *Attorney, Agent, or Firm* — Rossi, Kimms & McDowell LLP

(57) ABSTRACT

Document data to be edited includes reference information to external document data corresponding to a component document constituting the document data. When the component document is selected and when an instruction is given for the reflection thereof in the external document, a chapter to be updated is identified first, and reference information corresponding to that chapter is identified. Then, the external document identified by the reference information is overwritten and updated with the selected component document.

6 Claims, 34 Drawing Sheets

(56) References Cited

U.S. PATENT DOCUMENTS

| | | | |
|---|---|---|---|
| 2007/0220426 A1* | 9/2007 | Mueller et al. | 715/532 |
| 2008/0222506 A1* | 9/2008 | Petri | 715/208 |
| 2008/0282175 A1* | 11/2008 | Costin et al. | 715/760 |
| 2008/0316517 A1* | 12/2008 | Sato | 358/1.13 |
| 2008/0320380 A1* | 12/2008 | Pan et al. | 715/210 |
| 2009/0113282 A1* | 4/2009 | Schultz et al. | 715/208 |
| 2009/0199083 A1* | 8/2009 | Sar et al. | 715/231 |
| 2009/0201534 A1* | 8/2009 | Truong | 358/1.15 |
| 2009/0228126 A1* | 9/2009 | Spielberg et al. | 700/94 |
| 2009/0273804 A1* | 11/2009 | Kobashi | 358/1.15 |
| 2009/0276693 A1* | 11/2009 | Miyamoto | 715/234 |
| 2011/0296291 A1* | 12/2011 | Melkinov et al. | 715/229 |

FOREIGN PATENT DOCUMENTS

| | | |
|---|---|---|
| JP | 2002-63000 A | 2/2002 |
| JP | 2004-206170 A | 7/2004 |
| JP | 2006-107142 A | 4/2006 |

* cited by examiner

FIG. 4

```
    303
    ⌒
< Relationships >
    < Relationship Target="/FixedDocumentSequence.fdseq"/ >
</Relationships >
```

FIG. 5

```
    305
    ⌒
< FixedDocumentSequence >
    < DocumentReference Source="Documents/Document1/FixedDocument.fdoc"/ >
    < DocumentReference Source="Documents/Document2/FixedDocument.fdoc"/ >
</FixedDocumentSequence >
```

FIG. 6

```
    304
    ⌒
< Relationships >
    < Relationship Type="printticket"Target="MetaData/Job_PT.xml"/ >
</Relationships >
```

FIG. 7

```
    307
    ⌒
< PrintTicket >
    < Feature name="PageMediaSize" >
        < Option name="A4"/ >
    </Feature >
    < Feature name="PageOrientation" >
        < Option name="Portrait"/ >
    </Feature >
    < Feature name="Print Style" >
        < Option name="Saddle Stitch Booklet "/ >
    </Feature >
</PrintTicket >
```

FIG. 8

```
           316
< FixedDocument >
      < PageContent Source="Page/1.fpage"/ >
      < PageContent Source="Page/2.fpage"/ >
< /FixedDocument >
```

FIG. 9

```
    310
< Relationships >
      < Relationship Type="printticket"Target="MetaData/Document1_PT.xml"/ >
< /Relationships >
```

FIG. 10

```
           313
< PrintTicket >
      < Feature name="PageMediaSize" >
            < Option name="A4"/ >
      < /Feature >
      < Feature name="PageOrientation" >
            < Option name="Portrait"/ >
      < /Feature >
< /PrintTicket >
```

FIG. 11

```
            322
< FixedPage Width="816" Height="1056" >
    < Canvas >
        < Glyphs OriginX="20" OriginY="50"
            FontRenderingEmSize="16"
            FontUri"=/Resources/Meiryo.ttc"
            UnicodeString="Text Data"/ >
    < /Canvas >
< /FixedPage >
```

FIG. 12

```
    314
< Relationships >
    < Relationship Type="printticket" Target="MetaData/Page1_PT.xml"/ >
< /Relationships >
```

FIG. 13

```
                321
< PrintTicket >
    < Feature name="PageMediaSize" >
        < Option name="A4"/ >
    < /Feature >
    < Feature name="PageOrientation" >
        < Option name="Portrait"/ >
    < /Feature >
< /PrintTicket >
```

F I G. 14
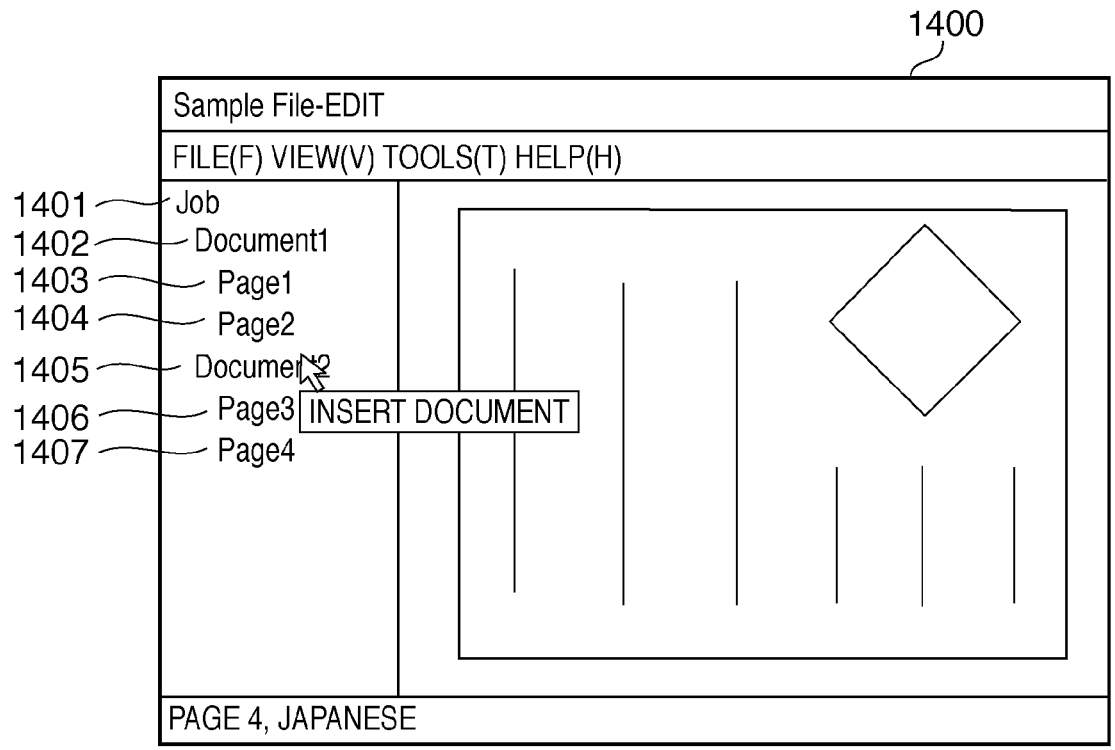
F I G. 15
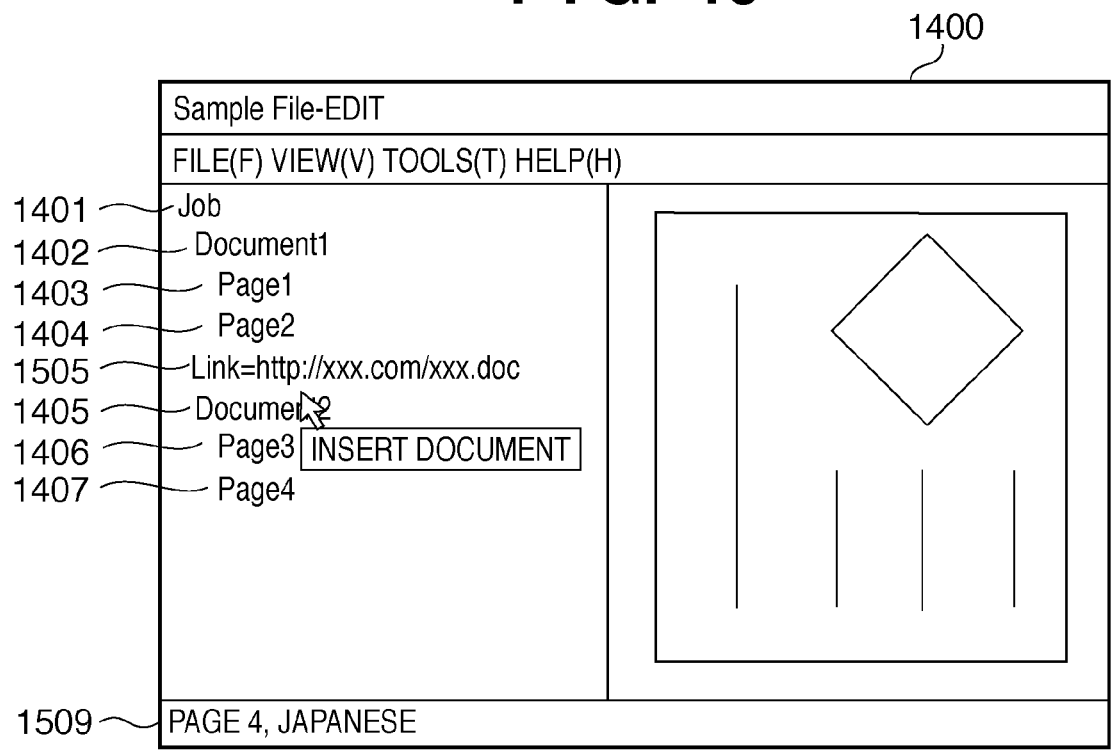

FIG. 18

```
                1800
               /
< PrintTicket >
    < Feature name="PageMediaSize" >
        < Option name="B5"/ >
    < /Feature >
    < Feature name="PageOrientation" >
        < Option name="Portrait"/ >
    < /Feature >
< /PrintTicket >
```

FIG. 19

```
                    305"
                   /
< FixedDocumentSequence >
    < DocumentReference Source="Documents/Document1/FixedDocument.fdoc"/ >
    < DocumentReference Source="Documents/DocumentA/FixedDocument.fdoc"/ >
    < DocumentReference Source="Documents/DocumentB/FixedDocument.fdoc"/ >
    < DocumentReference Source="Documents/Document2/FixedDocument.fdoc"/ >
< /FixedDocumentSequence >
```

FIG. 20

```
                    3916
                   /
< PrintTicket >
         < Feature name="PageMediaSize" >
  2000       < Option name="A4"/ >
         < /Feature >
         < Feature name="PageOrientation" >
             < Option name="Portrait"/ >
         < /Feature >
         < Link Original="http://xxx.com/xxx.doc"/ >
< /PrintTicket >
```

F I G. 23
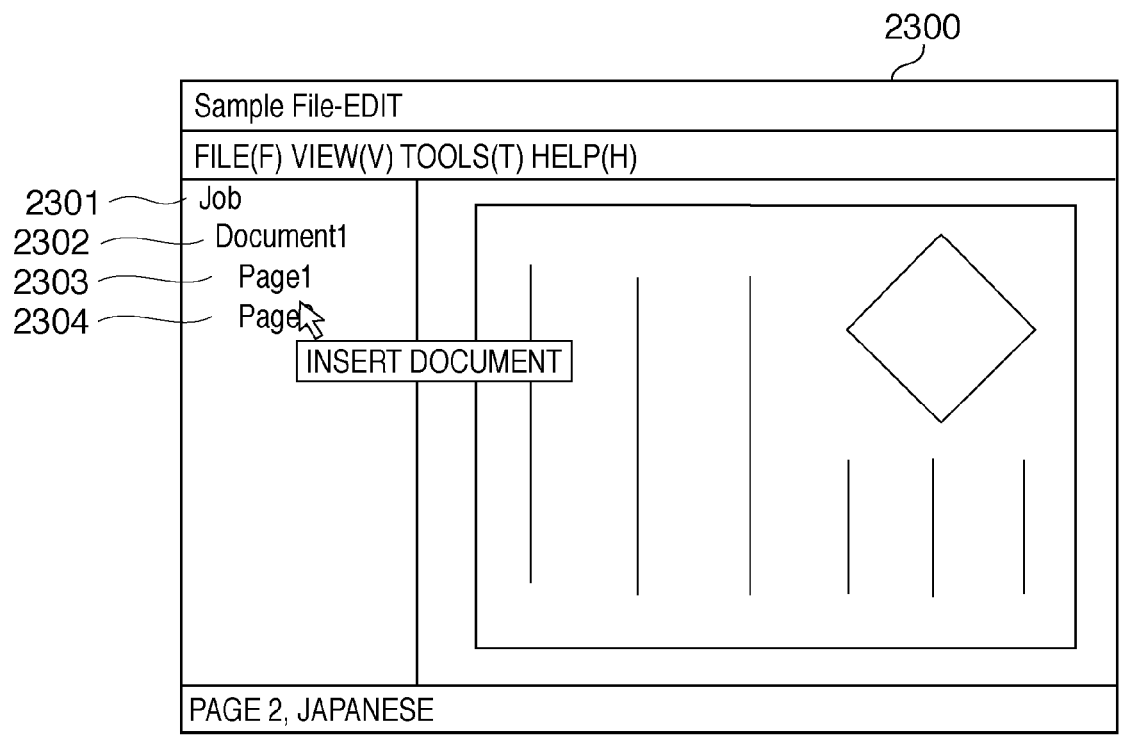

FIG. 27

```
                    2512
< PrintTicket >
      < Feature name="PageMediaSize" >
            < Option name="A4"/ >
      < /Feature >
      < Feature name="PageOrientation" >
            < Option name="Portrait"/ >
      < /Feature >
      < Link Original="http://xxx.com/xxx.doc"/ >
            < Doc="Document1"/ >
      < Link >
< /PrintTicket >
```

FIG. 28

```
                    2614
< PrintTicket >
      < Feature name="PageMediaSize" >
            < Option name="A4"/ >
      < /Feature >
      < Feature name="PageOrientation" >
            < Option name="Portrait"/ >
      < /Feature >
      < Link Original="http://xxx.com/xxx.doc"/ >
            < Doc="Document1"/ >
            < Sequence=1 >
      < Link >
< /PrintTicket >
```

F I G. 29

```
                          2616
< PrintTicket >
        < Feature name="PageMediaSize" >
                < Option name="A4"/ >
        < /Feature >
        < Feature name="PageOrientation" >
                < Option name="Portrait"/ >
        < /Feature >
        < Link Original="http://xxx.com/xxx.doc"/ >
                < Doc="Document1' "/ >
                < Sequence=2 >
        < Link >
< /PrintTicket >
```

```
                              1621
    < PrintTicket >
           < Feature name="PageMediaSize" >
                  < Option name="B5"/ >
           < /Feature >
           < Feature name="PageOrientation" >
                  < Option name="Portrait"/ >
           < /Feature >
    < /PrintTicket >
```

FIG. 36

```
< FixedDocumentSequence >
    < DocumentReference Source="Documents/Document1/FixedDocument.fdoc" / >
    < DocumentReference Source="Documents/Document2/FixedDocument.fdoc" / >
    < DocumentReference Source="Documents/Document1'/FixedDocument.fdoc" / >
    < DocumentReference Source="Documents/Document2'/FixedDocument.fdoc" / >
< /FixedDocumentSequence >
```

FIG. 37

```
                2405
< FixedDocumentSequence >
    < DocumentReference Source="Documents/Document1/FixedDocument.fdoc" / >
< /FixedDocumentSequence >
```

FIG. 38

```
< FixedDocumentSequence >
    < DocumentReference Source="Documents/Document1/FixedDocument.fdoc" / >
    < DocumentReference Source="Documents/DocumentA/FixedDocument.fdoc" / >
    < DocumentReference Source="Documents/Document1'/FixedDocument.fdoc" / >
< /FixedDocumentSequence >
```

```
305'
< FixedDocumentSequence >
    < DocumentReference Source="Documents/Document1/FixedDocument.fdoc" / >
    < DocumentReference Source="Documents/xxx/FixedDocument.fdoc" / >
    < DocumentReference Source="Documents/Document2/FixedDocument.fdoc" / >
< /FixedDocumentSequence >
```

4300

4400

```
                          4900
< PrintTicket >
      < Feature name="PageMediaSize" >
            < Option name="B5" >
      </Feature >
      < Feature name="PageOrientation" >
            < Option name="Portrait" >
      </Feature>
      < Link
ref="¥¥MyPC¥MyDoc.doc¥Documents¥DocumentA"/ >
 < /PrintTicket >
```

F I G. 52
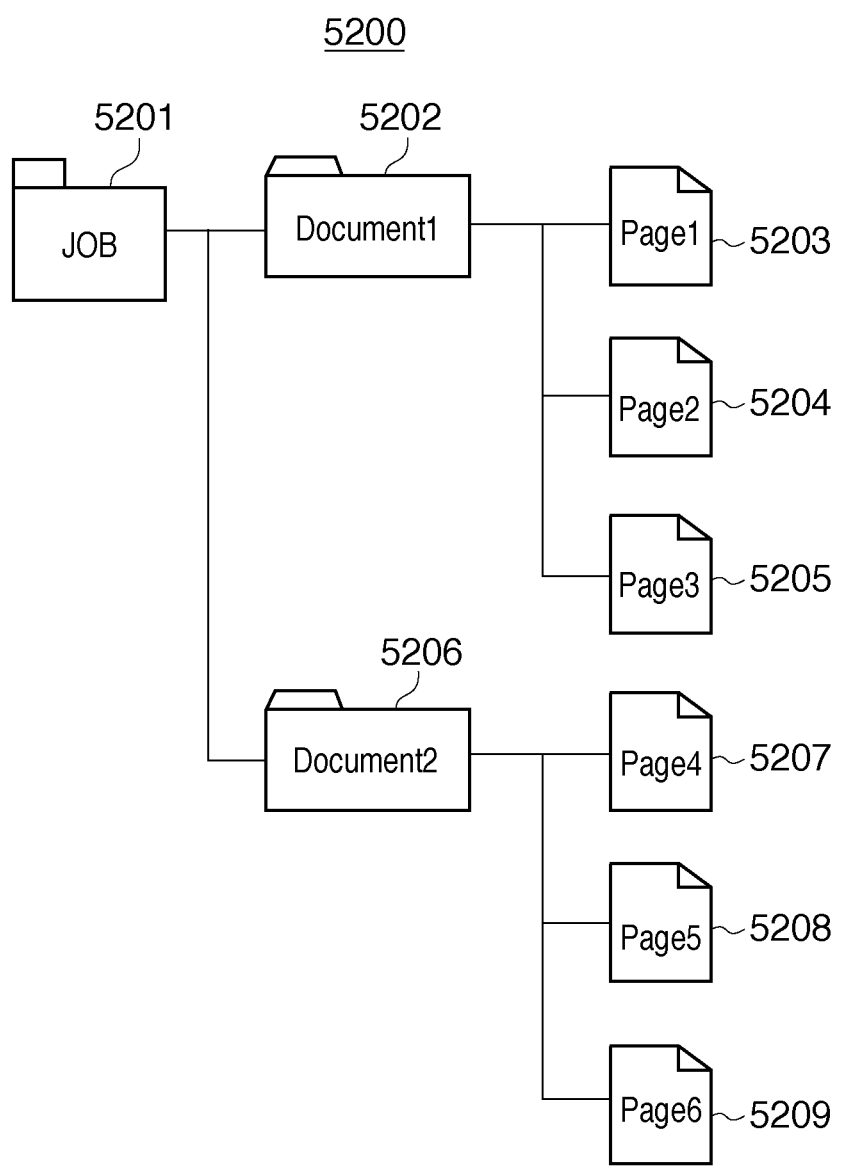

F I G. 53
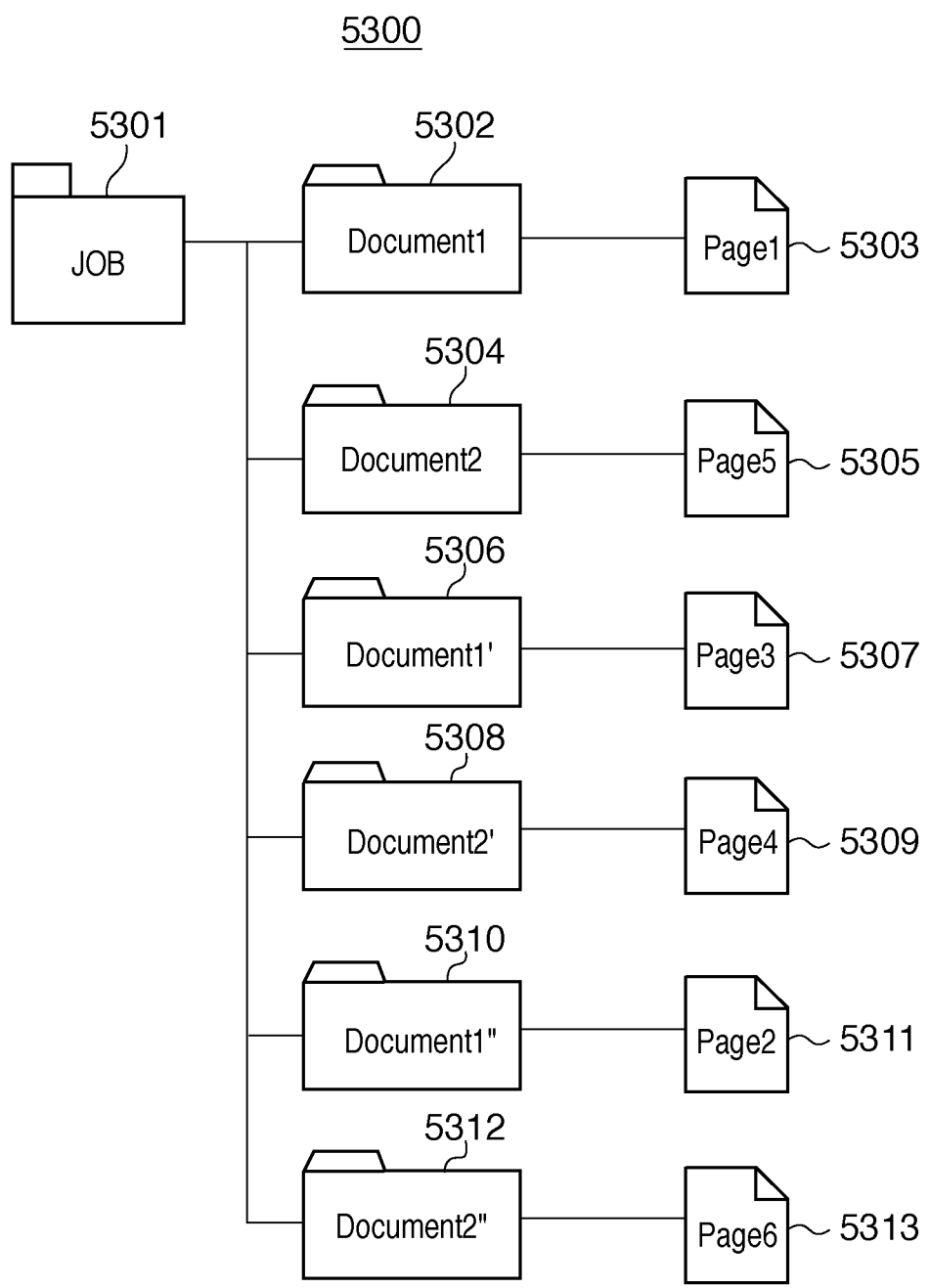

IMPORTING AN EXTERNAL SUBORDINATE DOCUMENT INTO A MASTER DOCUMENT, EDITING THE "SUBORDINATE" PORTION OF THE MASTER DOCUMENT AND UPDATING THE EXTERNAL SUBORDINATE DOCUMENT BY EXPORTING THE EDIT OF THE "SUBORDINATE" PORTION OF THE MASTER DOCUMENT TO THE EXTERNAL SUBORDINATE DOCUMENT

BACKGROUND OF THE INVENTION

1. Field of the Invention

The present invention relates to a document processing apparatus capable of, for example, merging or inserting an external structured document into a structured document while maintaining the structure of the external structured document, and a control method thereof.

2. Description of the Related Art

Conventionally, a document printing system has been proposed that stores management information, including document file names, storage locations and selected pages, in settings files to collectively manage document files, but does not save document file data (see, for example, Japanese Patent Laid-Open No. 2000-357074). This system references the settings files each time it prints a document file, and thus it is possible to obtain printed products in which document file updates are reflected.

There is also a technique in which when merging the print data of documents, captured documents are converted into intermediate data (e.g., PDF data) and merged into a single file, so that the preview and the merged document can be edited (see, for example, Japanese Patent Laid-Open No. 2002-63000). With this configuration, documents can be treated as components, and the components can be dispersed side by side.

However, according to Japanese Patent Laid-Open No. 2000-357074, it is not possible to merge and edit documents.

Also, according to Japanese Patent Laid-Open No. 2002-63000, it is possible to merge documents, but it is not possible to distinguish a document that was independent before being merged into merged document data. Accordingly, when, for example, after an external document has been merged into an original document, a portion corresponding to the external document is edited, it is not possible to reflect the edits in the original external document.

SUMMARY OF THE INVENTION

The present invention has been conceived in view of the conventional examples as described above, and the present invention provides a document processing apparatus with which edits made to document data in which a component document has been merged can be reflected in the component document data before merging, and a control method thereof.

In order to solve the above problems, the present invention includes the following configuration.

The present invention is a document processing apparatus for processing document data, the document data including reference information on external document data corresponding to a component document constituting the document data, the document processing apparatus including: an editor adapted to edit document data to be edited; and an updater adapted to update external document data corresponding to a selected component document with the selected component document based on the reference information.

According to the present invention, the problems to be solved by the present invention can be overcome. That is, edits made to document data in which a component document has been merged or inserted can be reflected in the component document data before being merged or inserted.

Further features of the present invention will become apparent from the following description of exemplary embodiments with reference to the attached drawings.

BRIEF DESCRIPTION OF THE DRAWINGS

FIG. 4 is a diagram illustrating an example of a ".rels" file 303 of a structured document according to an embodiment of the present invention.

FIG. 5 is a diagram illustrating an example of a "FixedDocumentSequence.fdseq" file 305 of a structured document handled in an embodiment of the present invention.

FIG. 6 is a diagram illustrating an example of a "FixedDocumentSequence.fdseq.rels" file 304 of a structured document handled in an embodiment of the present invention.

FIG. 7 is a diagram illustrating an example of a "Job_PT.xml" file 307 of a structured document handled in an embodiment of the present invention.

FIG. 8 is a diagram illustrating an example of a "FixedDocument.fdoc" file 316 of a structured document handled in an embodiment of the present invention.

FIG. 9 is a diagram illustrating an example of a "Document1.rels" file 310 of a structured document handled in an embodiment of the present invention.

FIG. 10 is a diagram illustrating an example of a "Document1_PT.xml" 313 of a structured document handled in an embodiment of the present invention.

FIG. 11 is a diagram illustrating an example of a "Page1.fpage" file 322 of a structured document handled in an embodiment of the present invention.

FIG. 12 is a diagram illustrating an example of a structured document handled in the present embodiment.

FIG. 13 is a diagram illustrating an example of a structured document handled in the present embodiment.

FIG. 14 is a diagram used to illustrate an example of a UI of an application program according to an embodiment of the present invention.

FIG. 15 is a diagram used to illustrate an example of a UI with which insertion of an external document 1600 into a structured document 300 is specified.

FIG. 18 is a diagram illustrating an example of a structured document handled in the present embodiment.

FIG. 19 is a diagram illustrating an example of a structured document handled in the present embodiment.

FIG. 20 is a diagram illustrating an example of an "xxx_PT.xml" file 3916 of a structured document handled in an embodiment of the present invention.

FIG. 23 is diagram used to illustrate an example of a UI of an application program according to an embodiment of the present invention.

FIG. 27 is a diagram illustrating an example of a structured document handled in the present embodiment.

FIG. 28 is a diagram illustrating an example of a structured document handled in the present embodiment.

FIG. 29 is a diagram illustrating an example of a structured document handled in the present embodiment.

FIG. 36 is a diagram illustrating an example of a structured document handled in the present embodiment.

FIG. 37 is a diagram illustrating an example of a structured document handled in the present embodiment.

FIG. 38 is a diagram illustrating an example of a structured document handled in the present embodiment.

FIG. 52 is a diagram illustrating the concept of a structured document handled in an embodiment of the present invention.

FIG. 53 is a diagram illustrating the concept of a structured document handled in an embodiment of the present invention.

DESCRIPTION OF THE EMBODIMENTS

The following embodiment describes a document processing apparatus and a document processing method (or system) with which, when editing is performed on document data obtained by merging component document data referenced by a link into a structured document while maintaining the structure of the component document data, the result of editing can be reflected in the original component document data.

Embodiment 1

Figure 1:
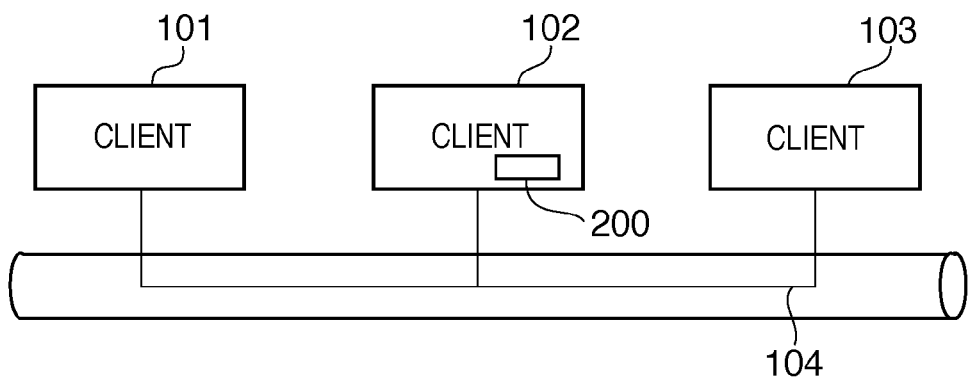
FIG. 1 is a block diagram illustrating an overall configuration of a document processing system.

FIG. 1 is a block diagram illustrating an overall configuration of a document processing system of the present embodiment. This print system includes clients (computers) 101 to 103 as information processing apparatuses, which are connected to one another via a network 104.

The clients (computers) 101 to 103 store application programs so as to be executable, and are capable of transmitting/receiving electronic data between them, and processing the electronic data with the application programs. The application programs include a document processing program according to the present embodiment, and the client computer that executes the document processing application functions as a document processing apparatus.

The communication performed between the apparatuses included in the document processing system may be wire communication using an Ethernet® cable or the like, or wireless communication using radio waves, light or the like.

Figure 2:
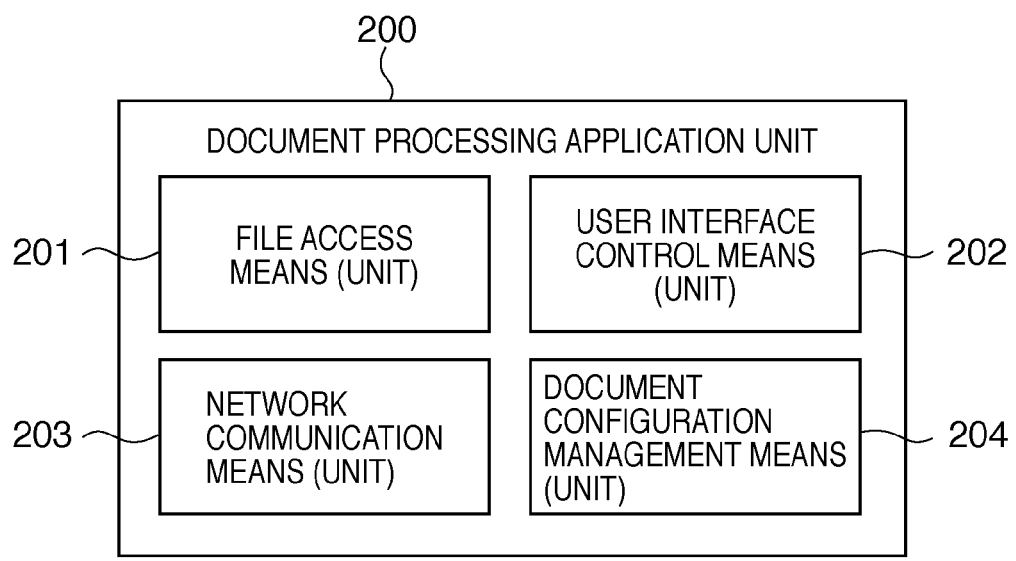
FIG. 2 is a diagram used to illustrate an example of a software configuration of an application program according to an embodiment of the present invention.

In the present embodiment, the client 101 executes an application program 200, and thereby generates a document. The client 101 references the documents contained in the client 102 or the client 103 from the document being edited by the application program 200. A software configuration of the application program 200 is shown in FIG. 2. The application program 200 is a document processing application program. As mentioned above, because the computer functions as a document processing apparatus, the application program 200 executed by the computer can be referred to as a "document processing application unit".

Figures 40, 41:
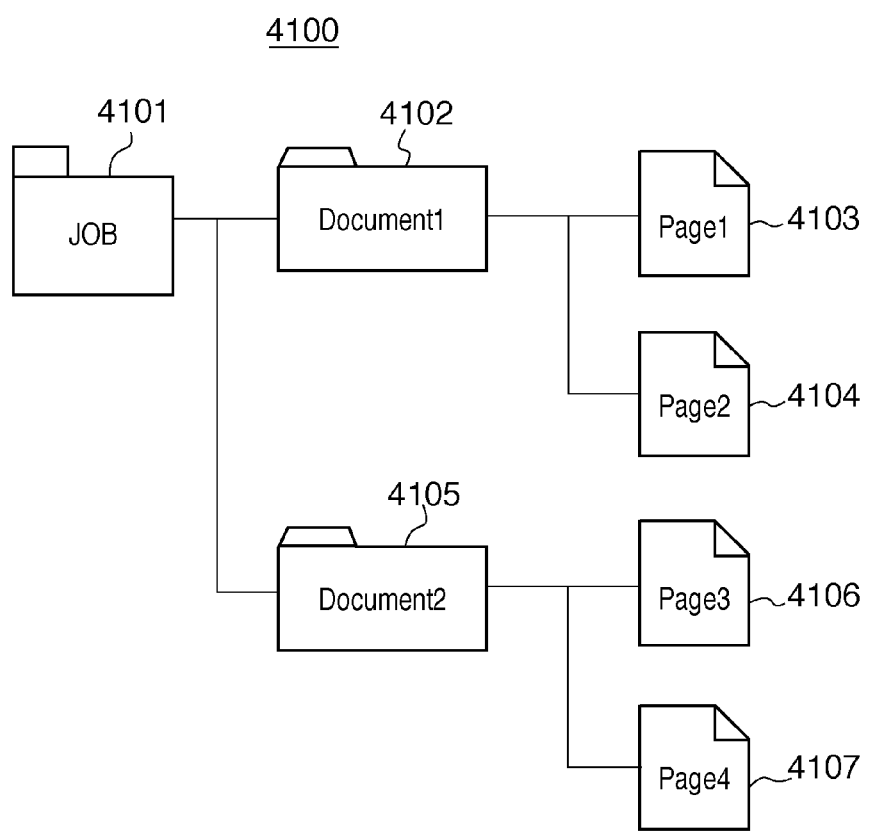
FIG. 40 is a diagram illustrating an updated "FixedDocumentSequence.fdseq" file 305'.
FIG. 41 is a diagram illustrating the concept of a structured document handled in an embodiment of the present invention.

A file access means (unit) 201 is a means for accessing a target document via the file system of an operating system of the client 101. A user interface control means (unit) 202 is a means for controlling an interface between the application program 200 and the user via the operating system of the client 101. At this time, an output means (unit) such as a display or audio output, or an input means (unit) such as a mouse or keyboard is used. A network communication means (unit) 203 is a means for controlling network communication of the application program 200 via the operating system of the client 101. A document configuration management means (unit) 204 is a means for managing the configuration of structured documents created or edited by the application program 200. A conceptual diagram of a structured document managed by the document configuration management unit 204 is shown in FIG. 41.

The structured document of FIG. 41 includes Job 4101 as a document root, and chapters constituting an intermediate layer are placed immediately below the root. In FIG. 41, the Job 4101 is made up of two chapters, Document1 4102 and Document2 4105. Each chapter includes pages. The Document1 4102 includes Page1 4103 and Page2 4104, and the Document2 4105 includes Page3 4106 and Page4 4107.

Example of Structured Document

Figure 3:
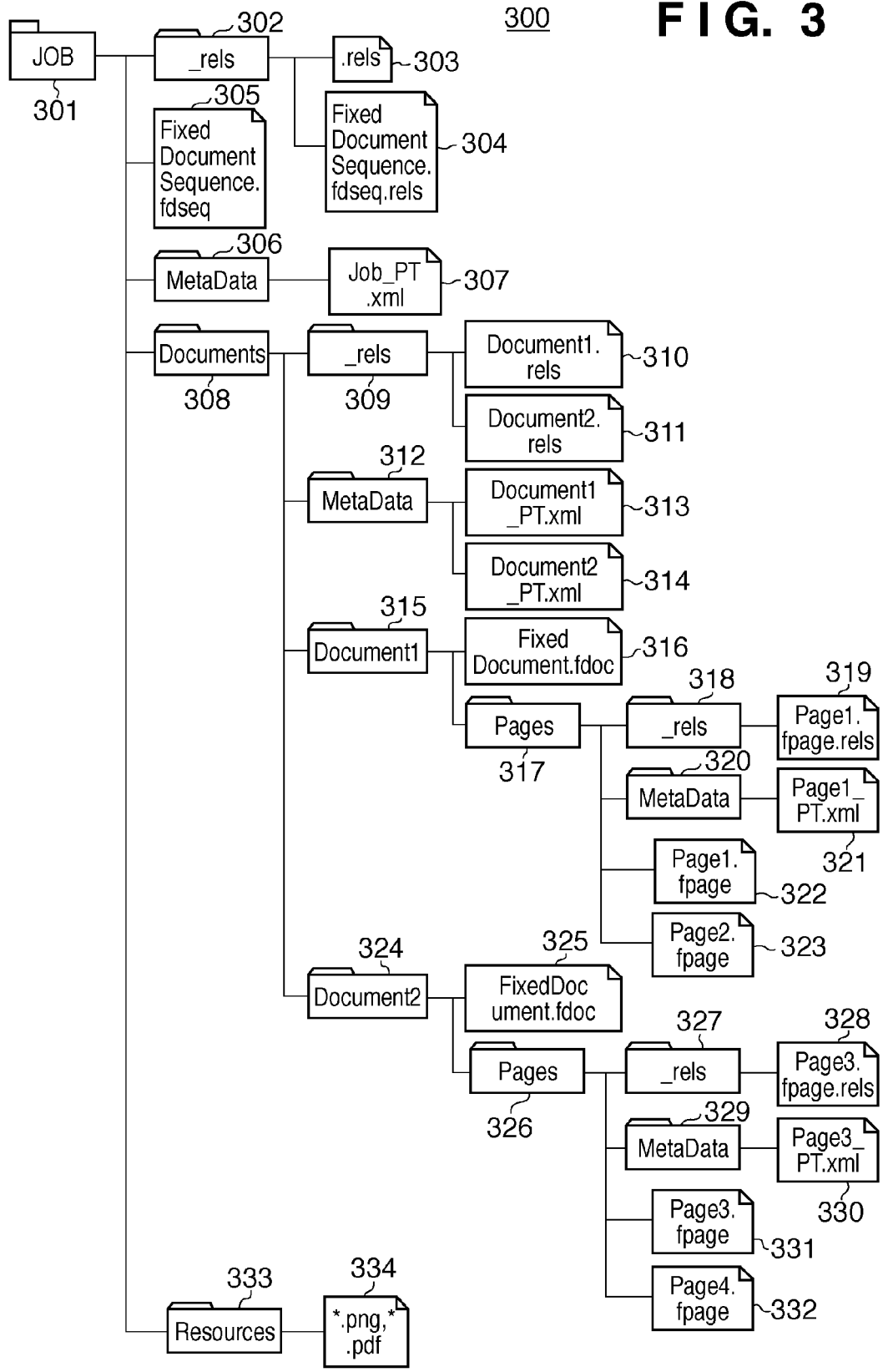
FIG. 3 is a diagram illustrating an example of a structured document handled in the present embodiment.

Next, a detailed example of a structured document according to the present embodiment is shown in FIG. 3. A structured document 300 is an archived file, and the archive has a hierarchical structure using a folder structure, with a JOB folder 301 as a root folder. The lowest layer, or in other words, the leaf nodes are pages. Herein, a structured document is also referred to simply as a "document".

Immediately below the JOB folder 301 are a "_rels" folder 302 that stores reference information on the whole document, a "FixedDocumentSequence.fdseq" file 305 indicative of configuration information on the document, a MetaData folder 306 that stores the metadata of the document, a Documents folder 308 that structuralizes and stores the actual data of the document, and a Resources folder 333 that stores resources utilized by the document. These folders and files will be described below one by one.

The "_rels" folder 302 includes a ".rels" file 303 that points to the configuration information file of the document, and a "FixedDocumentSequence.fdseq.rels" file 304 that links to the metadata and resource files used by the document.

An example of the ".rels" file 303 is shown in FIG. 4. The ".rels" file 303 is written in the XML format, and specifies the configuration information file of the document by referencing the "FixedDocumentSequence.fdseq" file 305 with a Relationship tag.

An example of the "FixedDocumentSequence.fdseq" file 305 is shown in FIG. 5. The "FixedDocumentSequence.fdseq" file 305 is written in the XML format. By enumerating DocumentReference tags within a FixedDocumentSequence tag, the data configured and managed in the document are referenced on a chapter by chapter basis in the order of enumeration. In the present embodiment, a first DocumentReference tag specifies "FixedDocument.fdoc" of Document1, and a second DocumentReference tag specifies "FixedDocument.fdoc" of Document2. As can be seen from the above, this document is comprised of a first chapter (Document1) and a second chapter (Document2).

An example of the "FixedDocumentSequence.fdseq.rels" file 304 is shown in FIG. 6. The "FixedDocumentSequence.fdseq.rels" file 304 is written in the XML format. By specifying a "Job_PT.xml" file 307 stored in the MetaData folder 306 with a Relationship tag, the print format for the whole document is specified.

FIG. 7 shows the "Job_PT.xml" file 307, which is an example of a file in which the print format for the whole document is written. The "Job_PT.xml" file 307 is written in the XML format. The names of print setting items are specified with Feature tags, and the setting values of the setting items are specified with Option tags. In the example of FIG. 7, "A4" is written in a feature "PageMediaSize" that specifies the paper used for printing. "Portrait" is written in a feature "PageOrientation" that specifies print orientation, and the paper orientation is set to a horizontal orientation in this example. "Saddle Stitch Booklet" is written in a feature "Print Style" that specifies a printing method, that is, saddle stitch bookbinding is set in this example.

In the present embodiment, the file for setting a print format is referenced by the "FixedDocumentSequence.fdseq.rels" file 304. However, aside from the file for setting a print format, a font, image data or other various resources used in the document may be referenced. The resources used in such a case, such as a font and image data, may be stored in the Resources folder 333, and image data 334 may be in the png format, pdf format or any other file format.

The document data to be structuralized and managed is stored in the Documents folder 308. "FixedDocument.fdoc" files referenced by the configuration information file "FixedDocumentSequence.fdseq" 305 are stored in a Document1 folder 315 and a Document2 folder 324 of the Documents folder 308, and page configuration information is written in the "FixedDocument.fdoc" files.

FIG. 8 shows an example of the "FixedDocument.fdoc" file 316. The "FixedDocument.fdoc" file 316 is written in the XML format. By enumerating the page files in the page order with PageContent tags, the page configuration information on the pertinent document is specified.

Furthermore, reference information referenced by the Document1 folder 315 and the Document2 folder 324 is written in the "_rels" folder 309.

FIG. 9 shows an example of a "Document1.rels" file 310. Within a Relationship tag, it is written that the Document1 folder 315 uses a "Document1_PT.xml" file 313 stored in a MetaData folder 312 as a print setting. Here, a situation can occur in which the print setting of the "Document1_PT.xml" file 313 differs from the print setting of the "Job_PT.xml" file 307, which is the print setting for the whole document. For example, if the "Document1_PT.xml" file 313 is written as shown in FIG. 10, saddle stitch bookbinding is not set, so the print setting differs from the print setting of the "Job_PT.xml" file 307. When the print setting for the whole document and the print setting for the component (chapter in this example) differ from each other as described above, the Document1 folder 315 may be printed in accordance with the print setting of the "Document1_PT.xml" file 313 or the print setting of the "Job_PT.xml" file 307. Also, a font, image data or other various resources used in Document1 may be referenced from the "Document1.rels" file 310. The resources used in such a case, such as a font and image data, may be stored in the Resources folder 333, and image data 334 may be in the png format, pdf format or any other file format. The Document1 folder 315 and the Document2 folder 324 have the same folder configuration and, thus, only a description of the Document1 folder 315 is given below.

Immediately below the Document1 folder 315 are the "FixedDocument.fdoc" file 316 and a Pages folder 317 storing the page data of Document1.

The Pages folder 317 includes a "Page1.fpage" file 322 and a "Page2.fpage" file 323, which are data for each page. The number of data files varies according to the number of pages. The "Page1.fpage" file 322 will be described with reference to FIG. 11. The "Page1.fpage" file 322 is written in the XML format. The width and height of the page are specified with a FixedPage tag. A description of characters is included within a Glyphs tag. The starting position of a character string is specified with OriginX and OriginY. The font size is specified in FontRenderingEmSize, and the font is specified in FontUri. In FIG. 11, the "Meiryo.ttc" font stored in the Resource folder 333 is specified. The character string and font type written in the page are specified with a UnicodeString tag. In FIG. 11, "Text Data" is written in Unicode.

Furthermore, a file referenced by the "Page1.fpage" file 322 is written in a "Page1.fpage.rels" file 319 of the "_rels" folder 318. The "Page1.fpage.rels" file 319 will be described with reference to FIG. 12. Within a Relationship tag, a "Page1_PT.xml" file 321 of a MetaData folder 320 is set as a print format of the page. Here, a situation can occur in which the print setting of the "Page1_PT.xml" file 321 differs from the print setting of the "Job_PT.xml" file 307, which is the print setting for the whole document, or the print setting of the "Document1_PT.xml" file 313, which is the print setting for Document1. If such a situation occurs, printing can be performed in accordance with the print setting of the "Page1_PT.xml" file 321, the print setting of the "Document1_PT.xml" file 313, or the print setting of the "Job_PT.xml" file 307. FIG. 13 shows an example of the "Page1_PT.xml" file 321. Also, a font, image data or other various resources used in the pertinent document may be referenced from the "Document1.rels" file 310.

Next, FIG. 14 shows a diagram illustrating an example of a UI for use by the user in editing the structured document 300 which is displayed by the user interface control means 202. The configuration of the structured document 300 being edited is displayed in the left pane of a UI 1400.

A job icon 1401 is an icon for displaying the Job, which is the root in the hierarchy of the structured document 300. In a Document1 1402 and a Document2 1405, the Document1 315, which is a first chapter of the document, and the Document2 324, which is a second chapter of the same are displayed, respectively. Also, the "Page1.fpage" 322 and the "Page2.fpage" 323, which are the page data of Document1 315, are cascaded from the Document1 1402, and displayed as a Page1 1403 and a Page2 1404.

Likewise, the "Page3.fpage" 331 and the "Page4.fpage" 332, which are the page data of Document2 324, are cascaded from the Document2 1405, and displayed as a Page3 1406 and a Page4 1407.

If the mouse pointer is right clicked on the UI 1400, an "Insert Document" menu for instructing an insertion function is displayed. With that menu, it is possible to specify a local file stored in the client 101, or a file, a chapter of the file or a page of the file stored in the clients 102 and 103 via a network.

Figure 16:
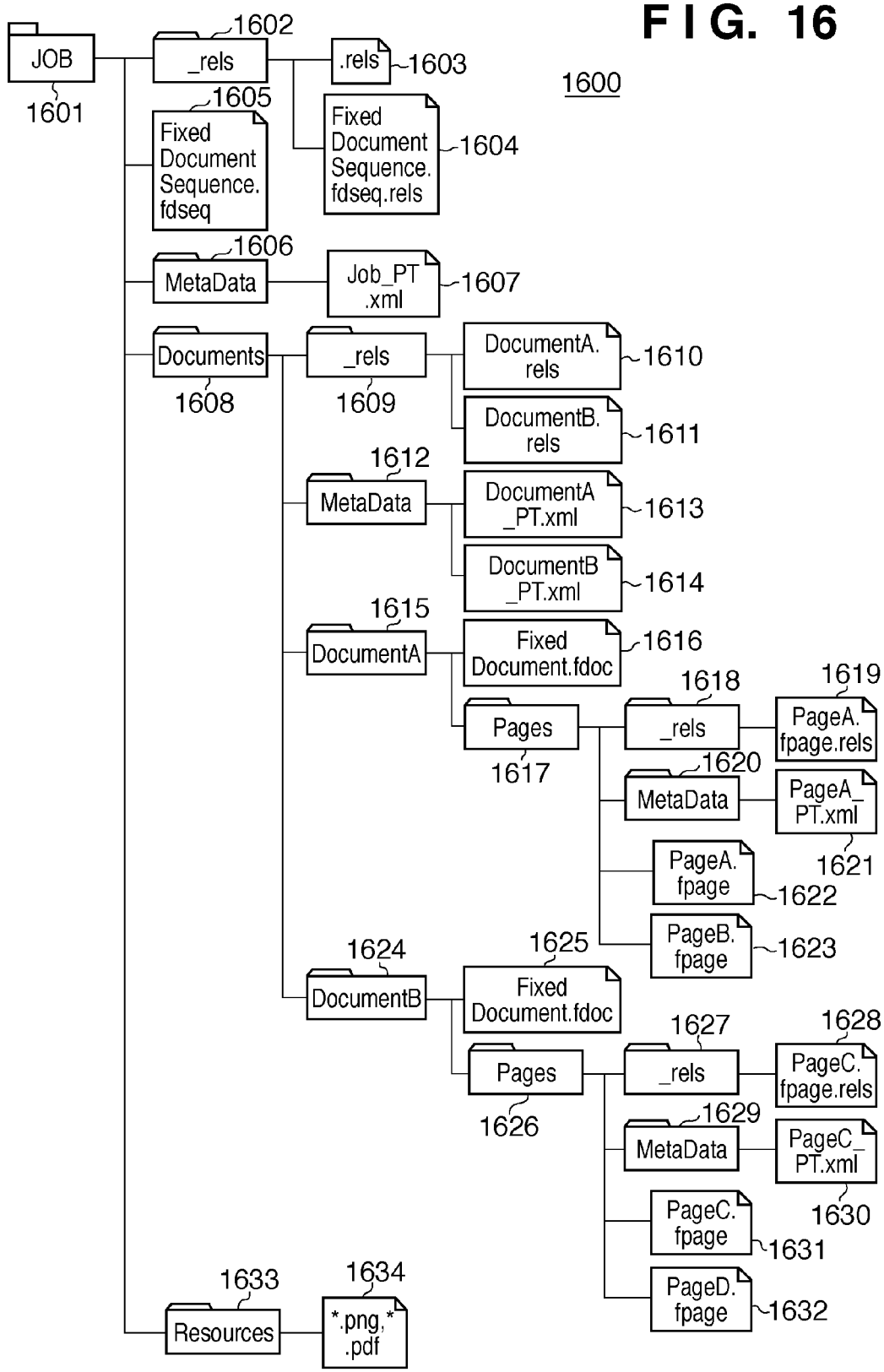
FIG. 16 is a diagram illustrating an example of a structured document handled in the present embodiment.

An example of an external document (external document data) specified and inserted according to the present embodiment is shown in FIG. 16. The configuration of an external document 1600 is the same as that of the structured document 300, except that the external document 1600 includes, as chapters, a DocumentA 1615 and a DocumentB 1624, that the DocumentA 1615 includes "PageA.fpage" 1622 and "PageB.fpage" 1623, and that the DocumentB 1624 includes "PageC.fpage" 1631 and "PageD.fpage" 1632.

A "DocumentA_PT.xml" 1613 in which the print format for DocumentA 1615 is written will be described with reference to FIG. 18. Within a PrintTicket tag 1800, "B5" is written in a feature "PageMediaSize", that is, it is specified that the DocumentA 1615 is to be printed on B5 size paper.

A UI displayed when insertion of the external document 1600 into the structured document 300 has been specified is shown FIG. 15. Regarding the documents displayed in FIG. 15, the page data of the external document 1600 is not acquired, and information (reference information) 1505 for specifying the storage location of the external document 1600 is stored in the structured document. The reference information can be, for example, a URL, a path, etc. that specifies the location of the external document 1600. The number of pages of the structured document 300 excluding the number of pages of the external document 1600 may be displayed as page information in a status bar 1509. Alternatively, it is also possible to display the total of the number of pages of the external document 1600 acquired and the number of pages of the structured document 300.

Figure 39:
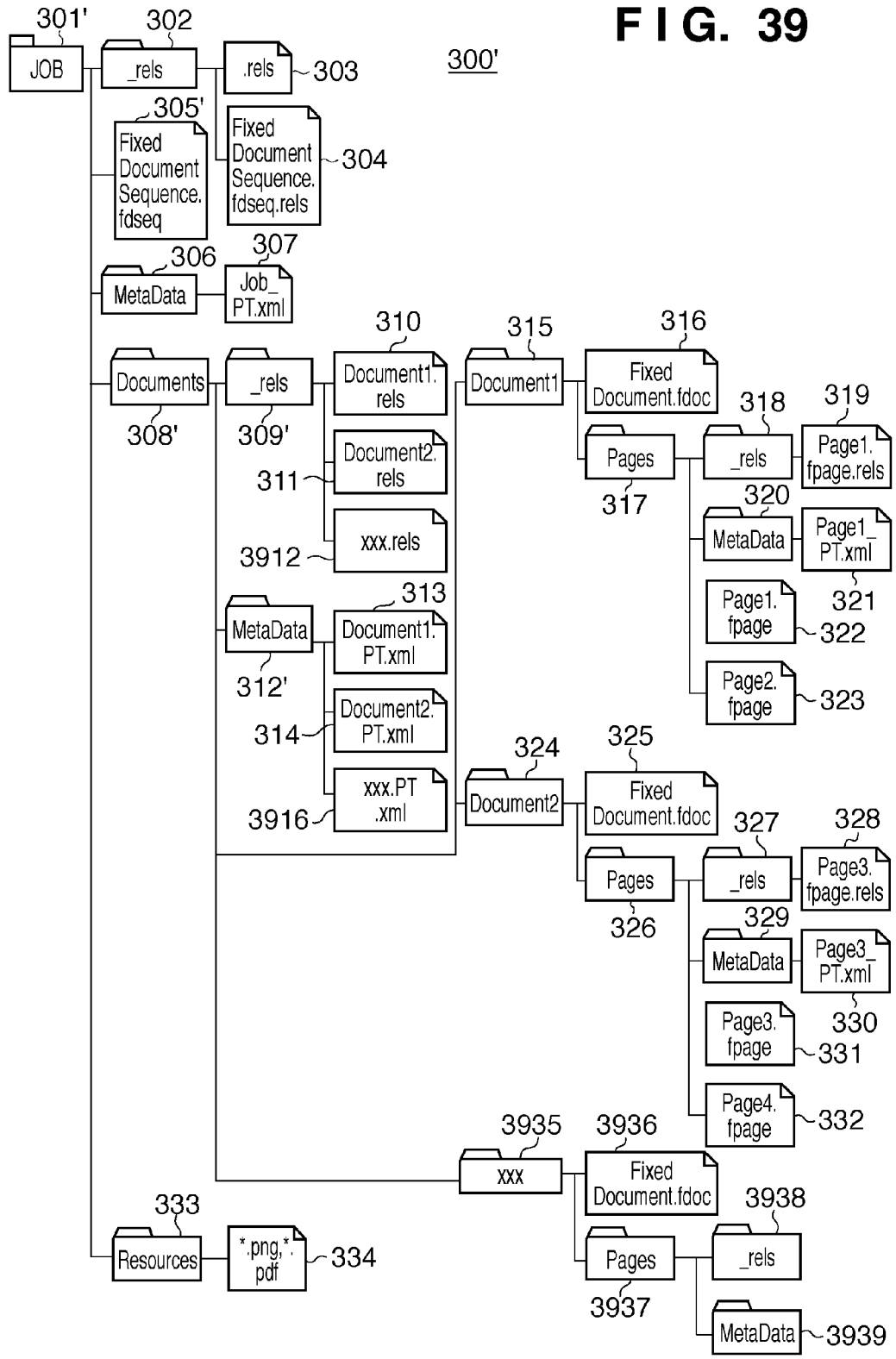
FIG. 39 is a diagram illustrating an example in which reference information on an external document 1600 is stored in a structured document 300 handled in an embodiment of the present invention.

An example in which the reference information on the external document 1600 is stored in the structured document 300 is shown in FIG. 39. In a structured document 300', "xxx.rels" 3912, "xxx_PT.xml" 3916 and an xxx folder 3935 including its subfolders and the like have been added to the structured document 300 as reservation information for inserting an external document. The "xxx_PT.xml" 3916 is referenced by the "xxx.rels" 3912. An example of the "xxx_PT.xml" 3916 is shown in FIG. 20. Within a PrintTicket tag 2000, the URL of the external document 1600 is specified with a Link tag.

The xxx folder 3935 includes a "FixedDocument.fdoc" file 3936 and a Pages folder 3937. The "FixedDocument.fdoc" file 3936 is an empty file. The Pages folder 3937 includes a "_rels" folder 3938 and a MetaData folder 3939 as empty folders.

A "FixedDocumentSequence.fdseq" file 305' that is an updated file obtained when the "FixedDocumentSequence.fdseq" file 305 is updated is shown in FIG. 40. "xxx" is inserted between Document1 and Document2 in the DocumentReference tags, so the chapters of the document are arranged in the order of Document1, xxx, and Document2.

Figure 30:
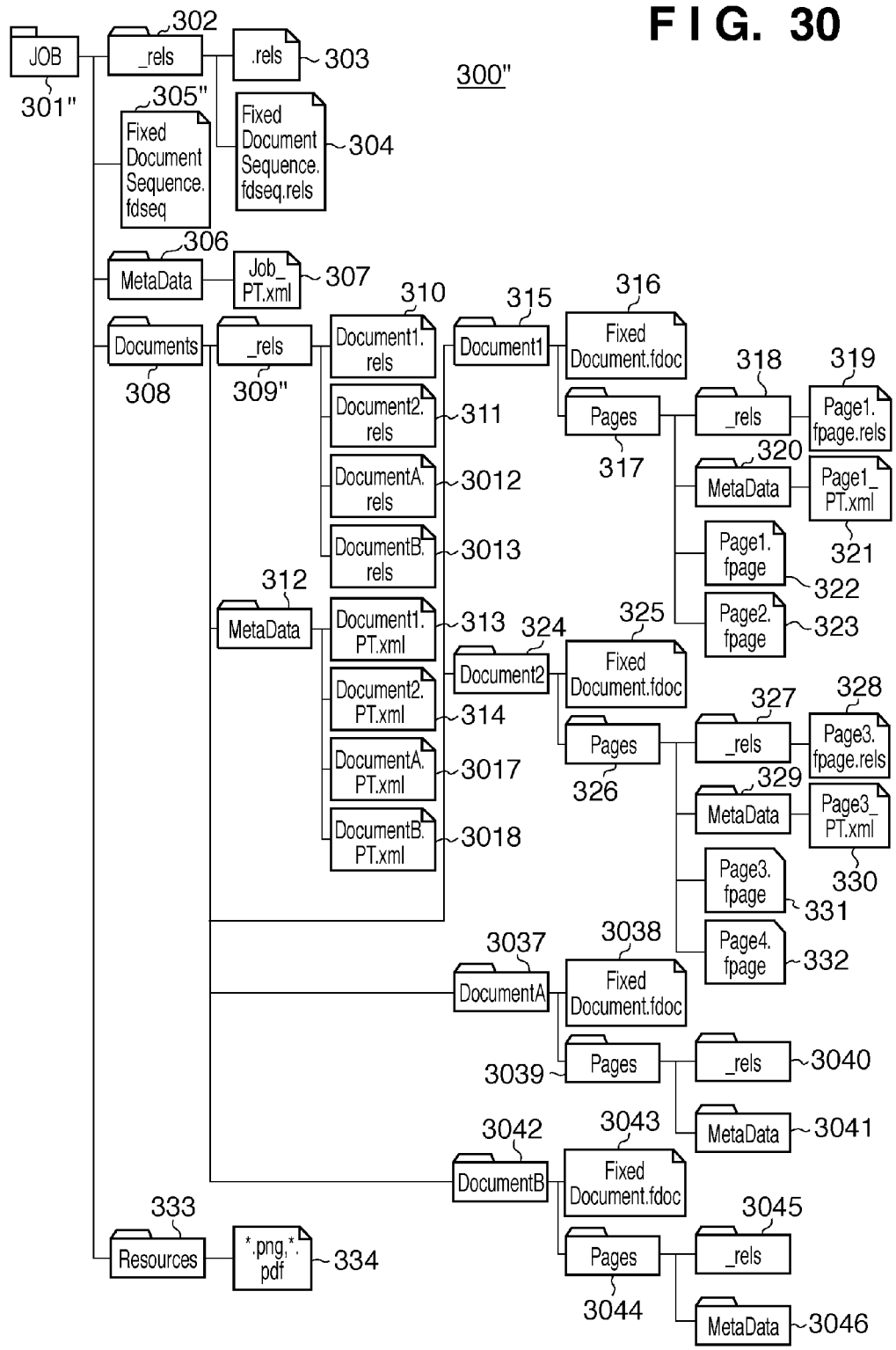
FIG. 30 is a diagram illustrating an example of a structured document handled in the present embodiment.

In FIG. 39, the reference information on the external document 1600 is stored as reference information regarding the whole document. However, as another embodiment, reference information regarding individual chapters of the external document 1600 may be stored, namely, reference information regarding DocumentA 1615 and reference information regarding DocumentB 1624. An embodiment in which reference information regarding individual chapters is stored in the document will be described with reference to FIG. 30. In FIG. 30, a DocumentA folder 3037 and a DocumentB folder 3042 are stored in accordance with the document configuration of the external document 1600. Furthermore, a "DocumentA.rels" file 3012 and a "DocumentB.rels" file 3013, which are reference information on each chapter, as well as a "DocumentA_PT.xml" file 3017 and a "DocumentB_PT.xml" file 3018 that set external reference information on each chapter, are stored.

When the DocumentA 3037 and the DocumentB 3042 are inserted, the "FixedDocumentSequence.fdseq" file 305 is updated. The updated "FixedDocumentSequence.fdseq" file 305 will be described with reference to FIG. 19. In FIG. 19, DocumentA and DocumentB are inserted between Document1 and Document2 in "DocumentReference" tags. That is, the chapters of the document are arranged in the order of Document1, DocumentA, DocumentB, and Document2.

Figure 47:
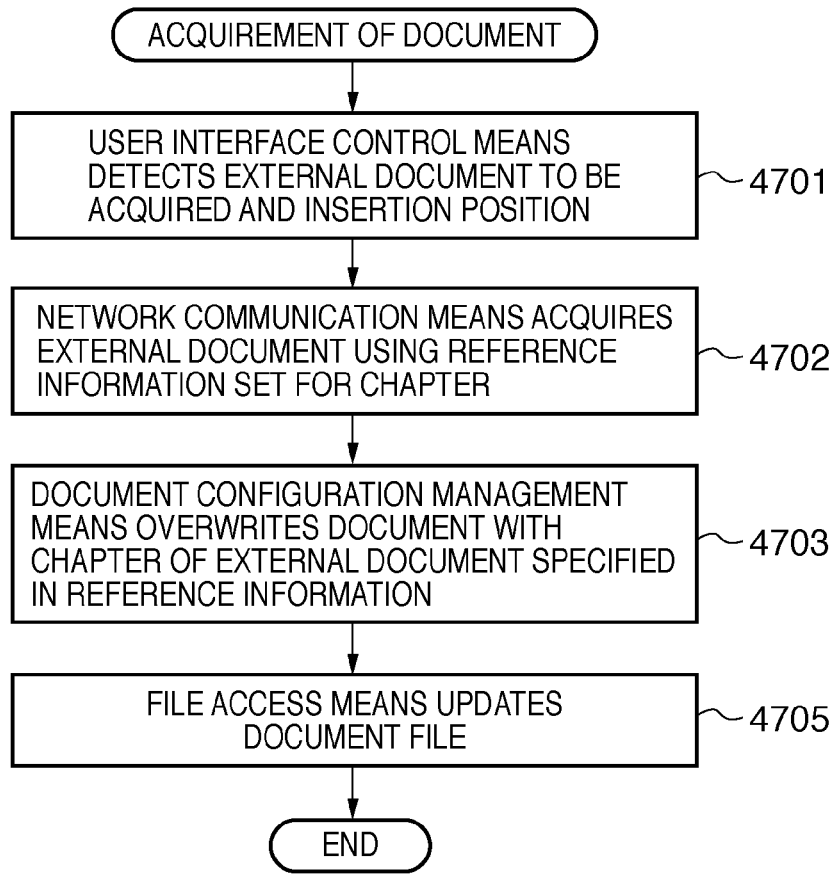
FIG. 47 is a diagram illustrating a process flow of an application program according to an embodiment of the present invention.

Next, an operation performed when "Acquire Document" is selected from a menu displayed upon right-clicking the mouse on the link information in FIG. 15 will be described. In FIG. 15, the link information (reference information) to an external document has been inserted into a document to be edited. FIG. 47 shows an example of a process flow of the operation performed by the application program 200.

In step 4701, the user interface control means 202 of the application program detects (or identifies) a document selected in the user interface (UI) of FIG. 15.

In the next step, step 4702, the network communication means 203 of the application program acquires an external document 1600 included in the reference information on the selected document (i.e., document data being edited).

In the next step, step 4703, the document configuration management means 204 of the application program overwrites the chapter of the document written in the reference information with the content of the external document written in that reference information (i.e., document data).

Figure 55:
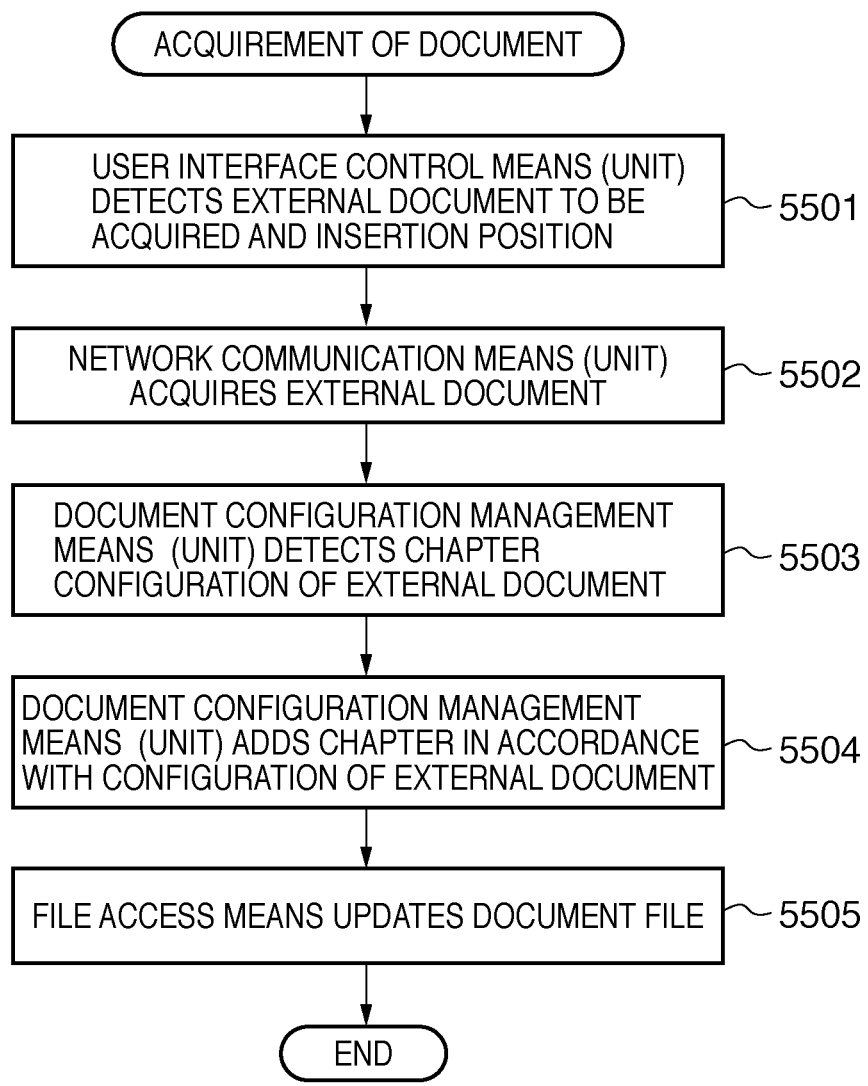
FIG. 55 is a diagram illustrating a process flow of an application program according to an embodiment of the present invention.

Finally, in step 4705, the file access means 201 of the application program overwrites and updates the stored document to be edited. This process flow is a flow performed when the chapters of the document and the chapters of the external document have been associated. FIG. 55 shows a process flow for acquiring an external document when the chapters of the document and the chapters of the external document are not associated, such as before the chapter configuration information on an external document is acquired, as shown in the structured document of FIG. 39.

In FIG. 55, in step 5501, the user interface control means 202 of the application program detects a document selected in FIG. 15.

In the next step, step 5502, the network communication means 203 of the application program acquires the external document 1600 written in the reference information on the selected document.

In the next step, step 5503, the document configuration management means 204 of the application program analyzes the chapter configuration of the external document 1600.

Figure 17:
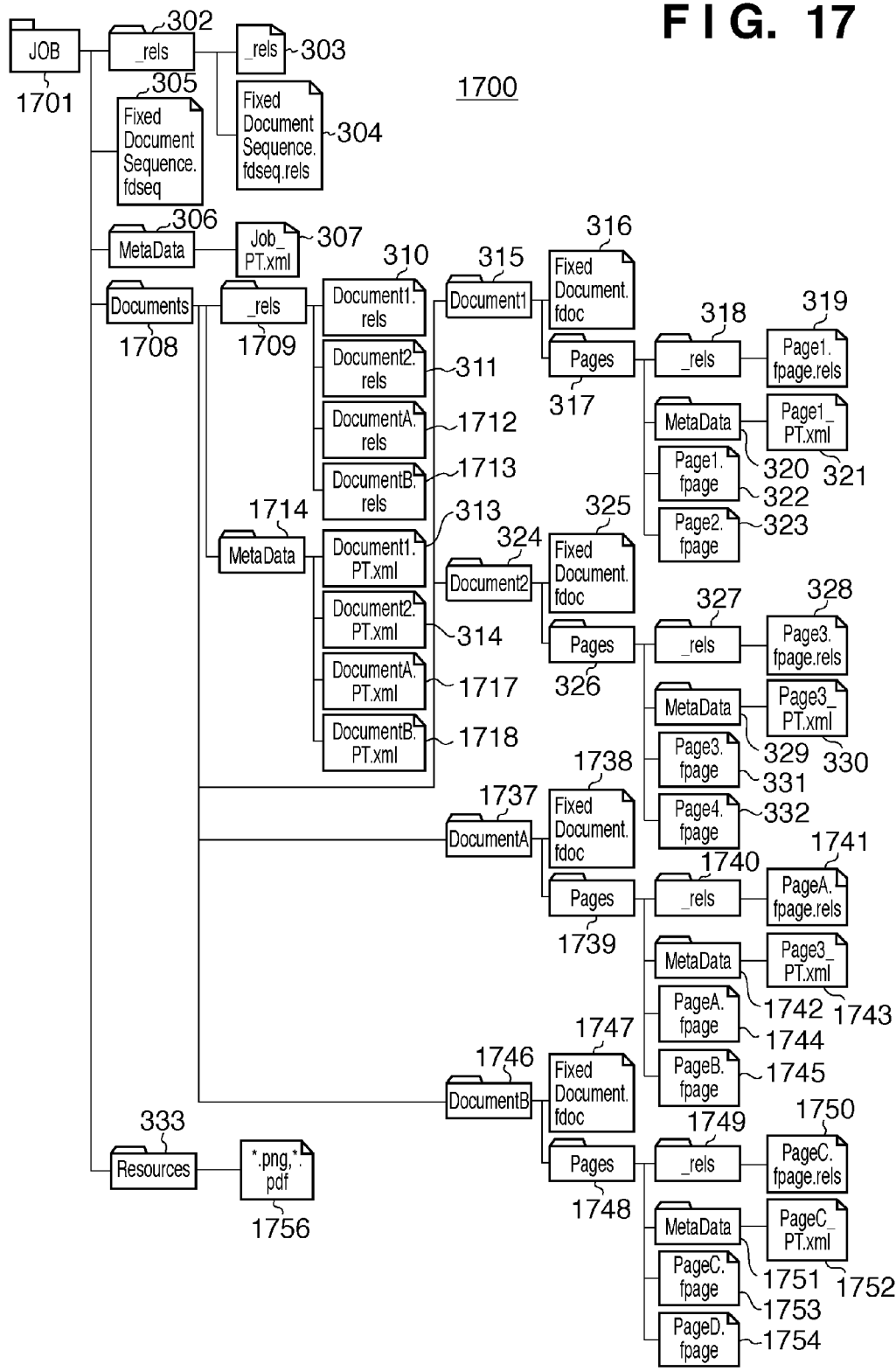
FIG. 17 is a diagram illustrating an example of a structured document handled in the present embodiment.

In the next step, step 5504, in accordance with the analyzed external document configuration, the specified position for inserting the document, which is the xxx folder 3935 in the case of FIG. 39, is changed to the chapter configuration of the external document; and the chapters of the external document are added. In the present embodiment, the xxx folder 3935 of FIG. 39 is replaced by the DocumentA 1615 and the DocumentB 1624 shown in FIG. 16. As a result, the document data of FIG. 17 is obtained.

Finally, in step 5505, the file access means 201 of the application program overwrites and updates the document.

Figure 42:
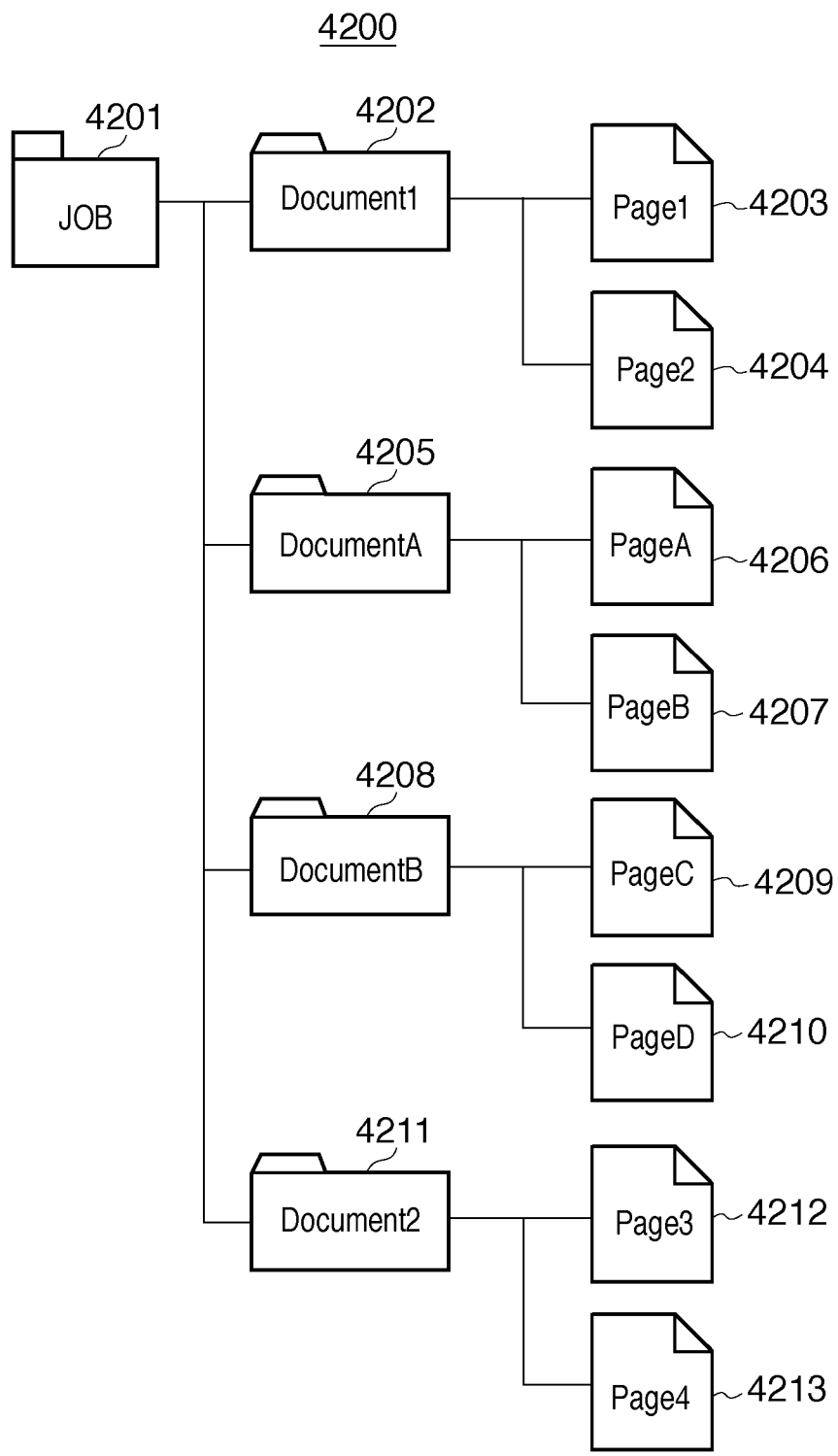
FIG. 42 is a diagram illustrating the concept of a structured document handled in an embodiment of the present invention.

FIG. 42 shows a conceptual diagram of a structured document obtained after the chapters of the external document 1600 have been incorporated into the structured document 300. DocumentA 4205 and DocumentB 4208 are inserted between Document1 4202 and Document2 4211 while the chapter structure of the external document is maintained. This configuration enables the insertion of chapters into the structured document 300 while the structure of the external document is maintained.

A document configuration after acquisition of the external document will be described in detail with reference to FIG. 17. A resource file 1634 of the external document 1600 is copied to a resource file 1756. At this time, a whole resource folder 1633 may be copied. Alternatively, only resources referenced by a "FixedDocumentSequence.fdseq.rels" file 1604, a "DocumentA.rels" file 1610, a "DocumentB.rels" file 1611, a "PageA.fpage.rels" file 1619, and a "PageC.fpage.rels" file 1628 may be copied.

Also, the "DocumentA.rels" file 1610 and the "DocumentB.rels" file 1611 are copied to a "_rels" folder 1709, and the "DocumentA_PT.xml" 1613 and the "DocumentB_PT.xml" file 1614 are copied to a MetaData folder 1714. Furthermore, the DocumentA folder 1615 of the external document, including its subfolders and the like, is copied to a DocumentA folder 1737 of the document to be edited, and the DocumentB folder 1624, including its subfolders and the like, is copied to a DocumentB folder 1746. When the files of the external document 1600 are copied, the path information written in the files may be revised in accordance with the configuration of the structured document 1700.

Also, the reference information on the external document 1600 may be written in a "DocumentA_PT.xml" file 1717 and a "DocumentB_PT.xml" file 1718. An example of the description of such reference information has already been shown in FIG. 20.

If there is a setting that conflicts with the settings of "Job_PT.xml" file 307 when the "DocumentA_PT.xml" 1717 and the "DocumentB_PT.xml" 1718 are copied, a setting of the "DocumentA_PT.xml" 1717 or the "DocumentB_PT.xml" 1718 may be changed to a setting that causes no conflict. Alternatively, it is also possible to prompt the user to change the setting via the user interface control means 202. For example, in the present embodiment, the PrintTicket of FIG. 7 is set in the "Job_PT.xml" file 307, that is, printing to A4 size paper with saddle stitch bookbinding is specified for the whole document, whereas in the "DocumentA_PT.xml" file 1613, printing to B5 print size paper is specified as shown in FIG. 18. In this case, it is sometimes not possible to bind A4 size paper sheets and B5 size paper sheets into a book by saddle stitching. If such a situation occurs, the PrintTicket 1800 may be changed to A4 size paper.

Figures 31, 32:
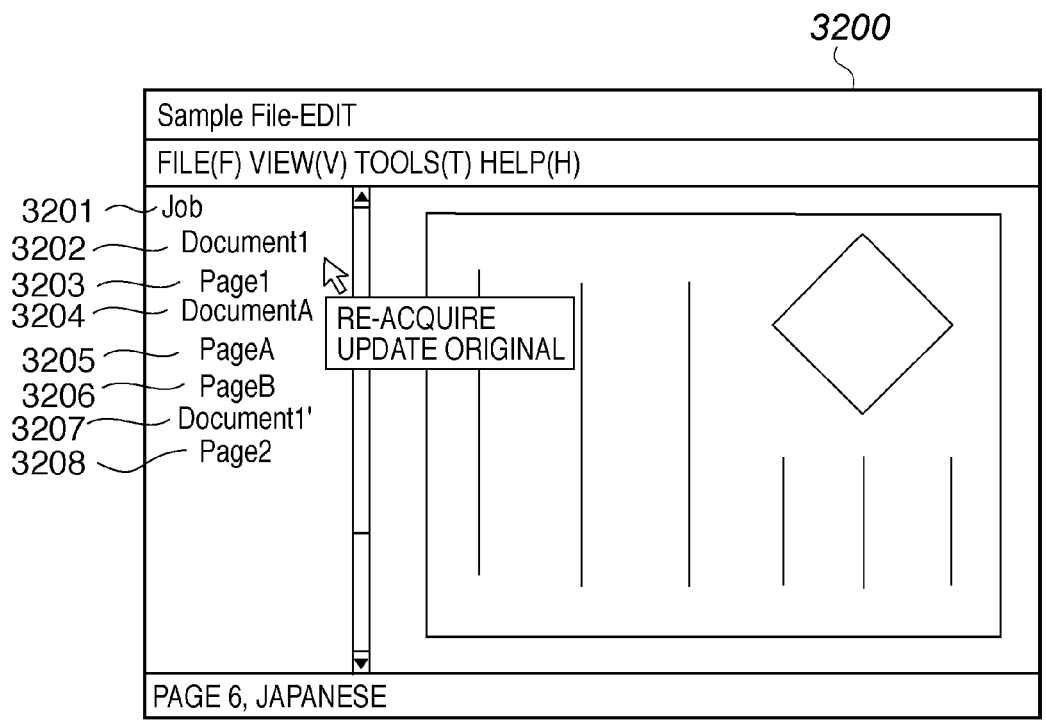
FIG. 31 is a diagram illustrating an example of a structured document handled in the present embodiment.
FIG. 32 is a diagram used to illustrate an example of a UI of an application program according to an embodiment of the present invention.

Likewise, if there is a setting that conflicts with the settings of the "Job_PT.xml" file 307, the "DocumentA_PT.xml" 1717, or the "DocumentB PT.xml" 1718 when the "PageA_PT.xml" 1621 and the "PageC_PT.xml" file 1630 are copied, a setting of the "PageA_PT.xml" 1621 and the "PageC_PT.xml" file 1630 may be changed to a setting that causes no conflict. Alternatively, it is also possible to prompt the user to change the setting via the user interface control means 202. For example, if B5 size paper is specified in the "PageA_PT.xml" file 1621 as shown in FIG. 31, the paper size may be changed to A4.

Figure 21:
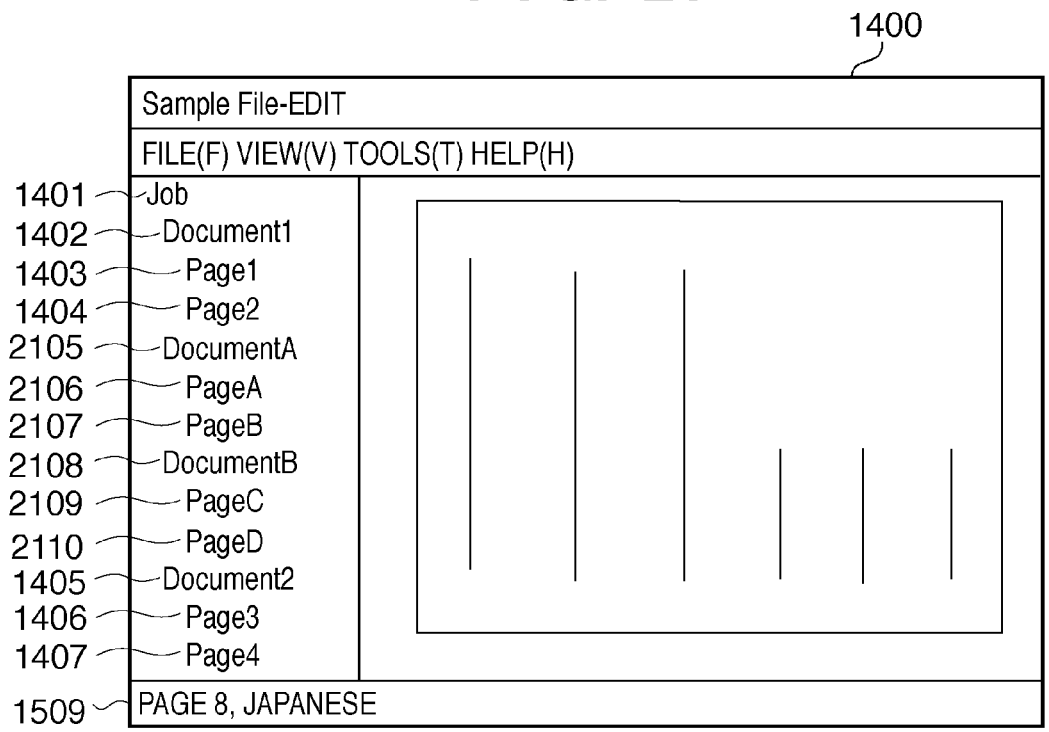
FIG. 21 is a diagram used to illustrate an example of a UI of an application program according to an embodiment of the present invention.

FIG. 21 shows a UI displayed by the user interface control unit 202 of the application program after insertion of the external document 1600 into the structured document 300. In FIG. 21, DocumentA 2105 and DocumentB 2108 are inserted between Document1 1402 and Document2 1405.

In the present embodiment, external reference information is stored in the document at a point in time when an external document is inserted in FIG. 14, and the external document is acquired at an arbitrary timing specified by the user. However, the external document may be acquired immediately after the user specifies insertion of the external document in FIG. 14, and then merged into the structured document 300.

In the present embodiment, it is also possible to set reference information on the structured document in the "DocumentA_PT.xml" 1613 and the "DocumentB_PT.xml" 1614 of the external document 1600 when reference information on the external document 1600 is set in the structured document 300 or when the external document 1600 is acquired in the structured document 300.

Figures 49, 50:
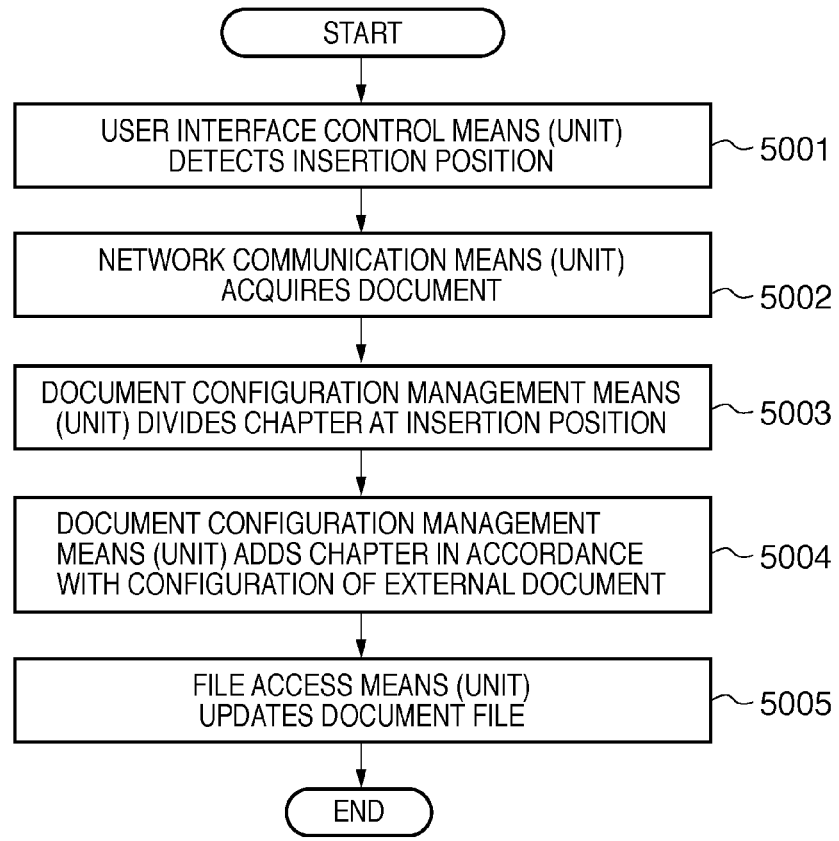
FIG. 49 is a diagram illustrating reference information on an external document being set according to an embodiment of the present invention.
FIG. 50 is a diagram illustrating a process flow of an application program according to an embodiment of the present invention.

FIG. 49 shows an example in which the reference information is set in the "DocumentA_PT.xml" 1613 of the external document. The reference information is set with a "ref" attribute in a Link tag. By doing so, the pertinent component document (chapter in the present embodiment) of the document to be edited may be overwritten in accordance with the setting information written in the reference information on the external document when the external document is updated.

A menu displayed upon right clicking the mouse on the acquired external document will be described next with reference to FIG. 22. When a component of the document is selected from the displayed menu, a right-click is performed, "Re-acquire" is selected from the displayed menu, and copying of the external document 1600 is executed again.

When "Update Original" is selected from the menu, all of the parts acquired from the external document, including the specified component documents, the specified pages, or the specified portions, are uploaded from the structured document 1700 to the external document.

Reflection of Edit to Original Document

Figure 56:
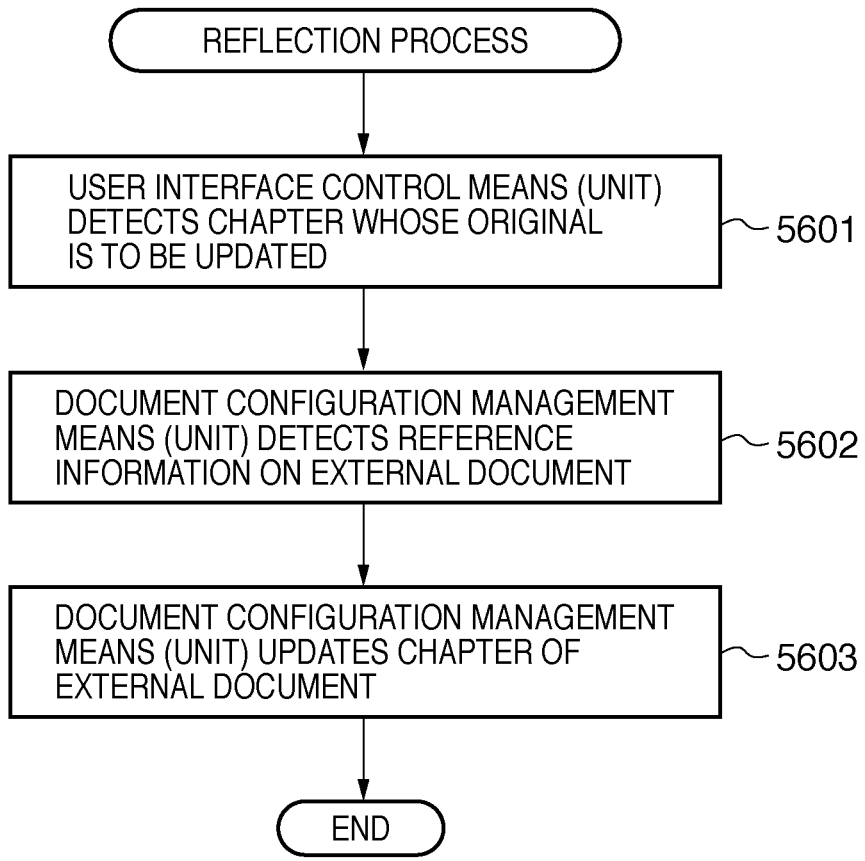
FIG. 56 is a diagram illustrating a process flow for reflecting an edit operation on a merged document into an external document according to embodiment of the present invention.

A process flow performed by the application program to update the external document according to the present embodiment is shown in FIG. 56.

In step 5601, the user interface control means 202 of the application program detects (identifies) a selected portion whose original is to be updated.

In the next step, step 5602, the document configuration management means 204 of the application program identifies an external document 1600 written in the reference information on the document of the selected portion.

In the next step, step 5603, the network communication means 203 of the application program updates the external document. In other words, the portion of the external document associated with the reference information on the selected portion of the document to be edited is overwritten with the selected portion. For example, if chapter "DocumentA" 1737 is selected in FIG. 17, "DocumentA" 1615, which is the actual data of the external document 1600 associated with the reference information on the "DocumentA" 1737, is updated with the "DocumentA" 1737. Even after the external document is acquired, the reference information is stored in the document to be edited without being deleted and, therefore, such an association becomes possible.

Figure 22:
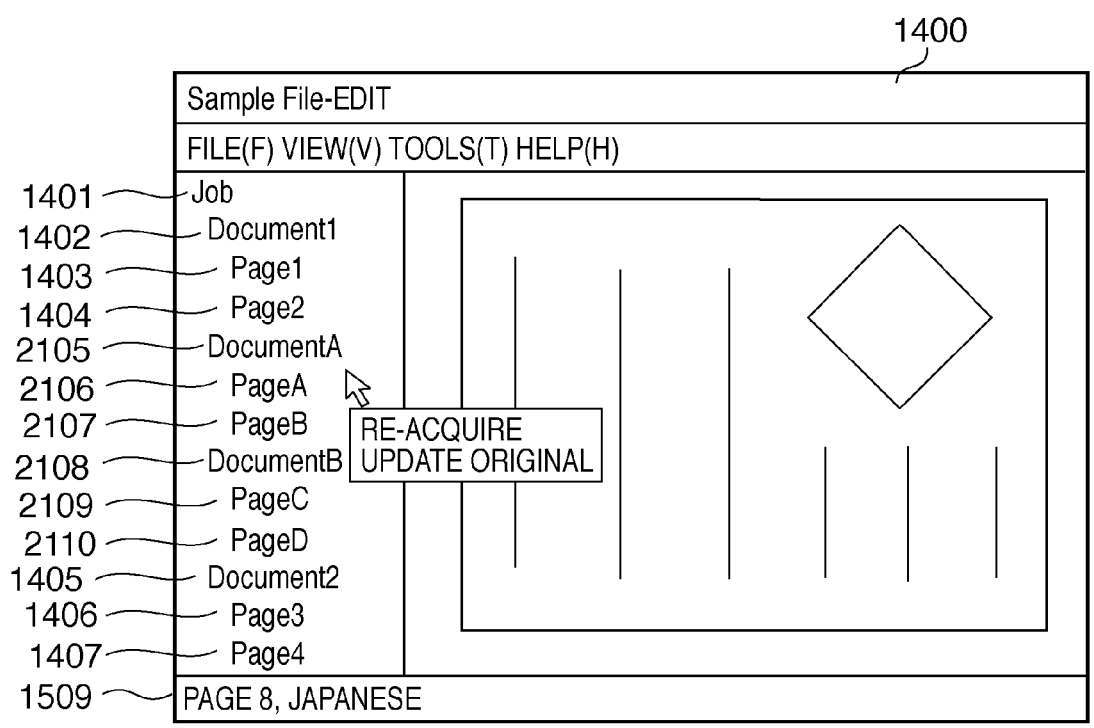
FIG. 22 is a diagram used to illustrate an example of a UI of an application program according to an embodiment of the present invention.

In the above, the external document 1600 is updated on a chapter by chapter basis, but the whole external document 1600 may be updated, or only the chapters and pages specified in FIG. 22 may be updated. The update may be performed in any other way within the scope of the present invention.

In the present embodiment, the resource file 1756 of the document to be edited 1700 is uploaded first. As used herein, "upload" refers to the transmission of document data used to overwrite to a computer having such an external document. This term may further encompass overwriting. The resources to be uploaded may be copied by copying the whole file, or only resources referenced by the "FixedDocumentSequence.fdseq.rels" 304, "DocumentA.rels" 1712, "DocumentB.rels" 1713, "PageA.fpage.rels" 1741 and "PageC.fpage.rels" 1750 may be copied. Then, the "DocumentA.rels" file 1712 and the "DocumentB.rels" file 1713 are uploaded. Also, the "DocumentA_PT.xml" file 1717 and the "DocumentB_PT.xml" file 1718 are uploaded. In addition, the DocumentA folder 1737, including its subfolders and the like, and the DocumentB folder 1746, including its subfolders and the like, are uploaded. When uploading the files, path information written in the files may be revised in accordance with the configuration of the external document.

With the above configuration, it is possible to merge a plurality of documents while the reference information is left in the "DocumentA_PT.xml" 1717 and the "DocumentB_PT.xml" 1718. Accordingly, even when the merged document is edited, such as inserting a page, changing the page order, and changing the document configuration, the edit(s) made can be reflected in the original document before merging. In addition, re-acquirement of a document from a link and updating with the latest data are also made possible.

Figure 48:
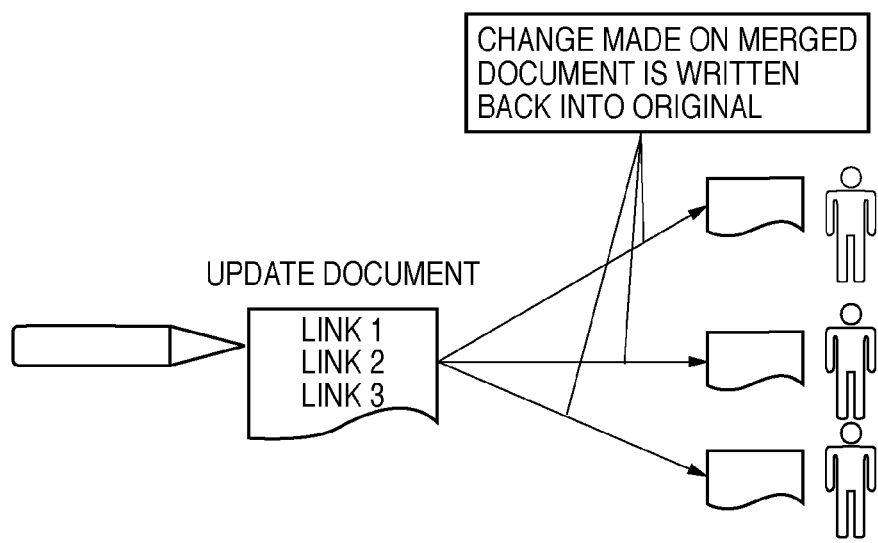
FIG. 48 is a diagram illustrating the concept of an operation of an application program according to an embodiment of the present invention.

FIG. 48 shows a conceptual diagram illustrating a situation when an update is reflected into an original document after the document is revised, edited or the like. A revision made to the merged document is reflected in the document of the editor of the original.

In the present embodiment, the user specifies reference information for the whole external document, but a configuration is also possible in which the user sets reference information for each chapter.

Editing of Structured Document

Figure 24:
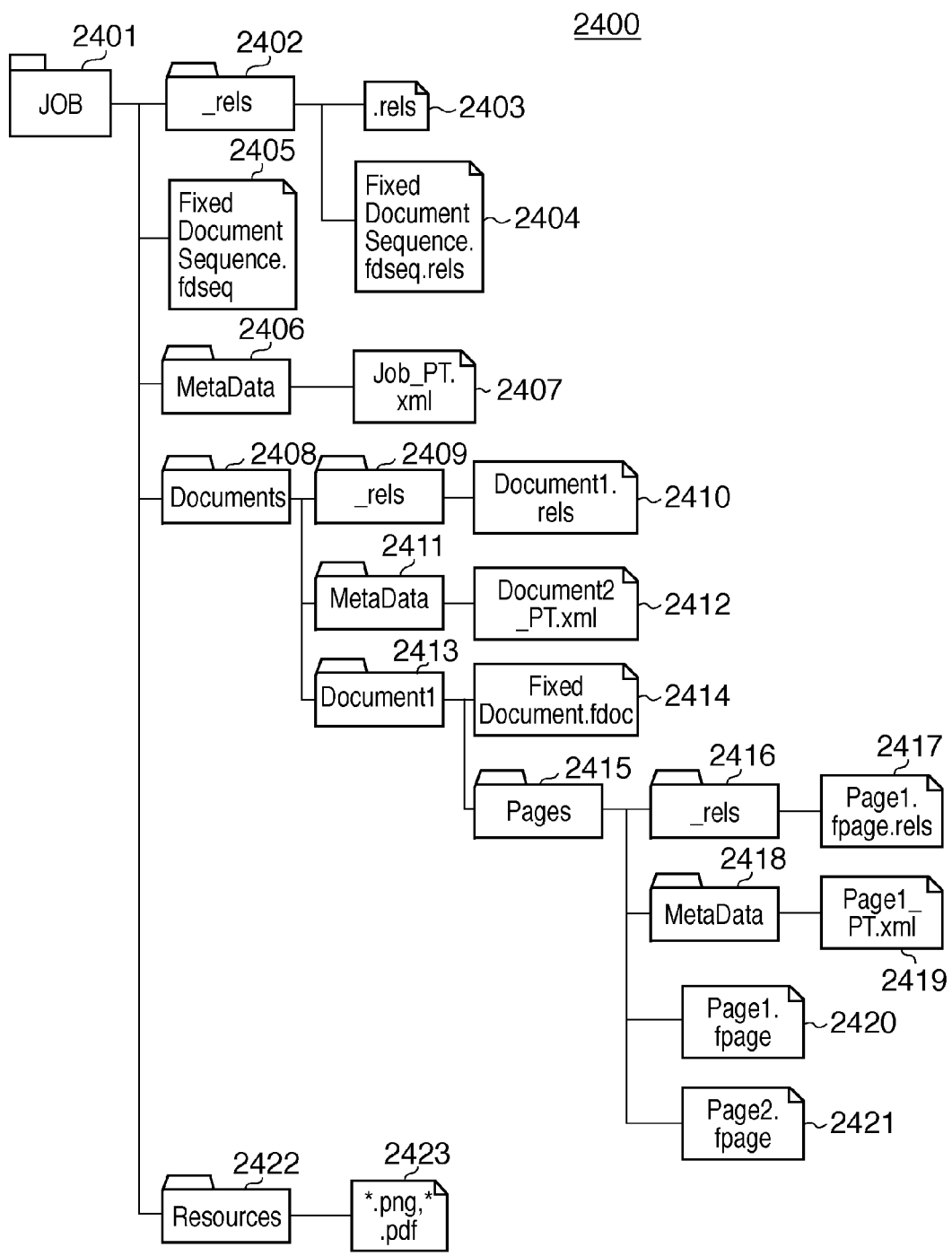
FIG. 24 is a diagram illustrating an example of a structured document handled in the present embodiment.
Figure 43:
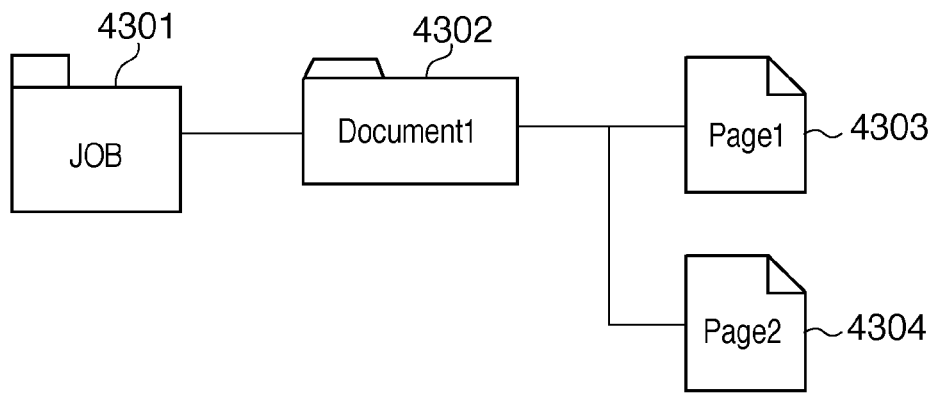
FIG. 43 is a diagram illustrating the concept of a structured document handled in an embodiment of the present invention.

A process for editing a structured document will be described next with reference to FIG. 24. In FIG. 24, the document structure is basically the same as that of FIG. 3, except that the document is made up of one chapter and the chapter includes two pages. FIG. 43 shows a conceptual diagram of the structured document of FIG. 24. Immediately below Job 4301 as a document root is Document1 4302 having a chapter structure. The Document1 4302 includes Page1 4303 and Page2 4304, which are page data.

"FixedDocumentSequence.fdseq" 2405 is shown in FIG. 37. Because the document is made up of one chapter, only Document1 is referenced in a DocumentReference tag. Document1 2413 is a document (component document) that has acquired an external document, and "DocumentA_PT.xml" 2512 stores the setting shown in FIG. 27. Within a PrintTicket tag, the link information on the acquired external document is written with a Link tag. Also, the information on the referenced document of the external document is stored within a Doc tag.

A UI 2300 displayed when the document with the configuration shown in FIG. 24 is edited through the application of the client 101 is shown in FIG. 23. Under Job 2301, a document root is displayed. Under Document1 2302, Document1 2413, which is a chapter of the document, is displayed. Also, "Page1.fpage" 2420 and "Page2.fpage" 2421, which are pages of the chapter, are displayed as Page1 2303 and Page2 2304 cascaded from the Document1 2413.

In the UI 2300, insertion of an external document between the pages is specified by selecting "Insert Document" from the menu displayed upon right-clicking between Page1 2303 and Page2 2304 with the mouse. The external document specified is shown in FIG. 25.

Figure 25:
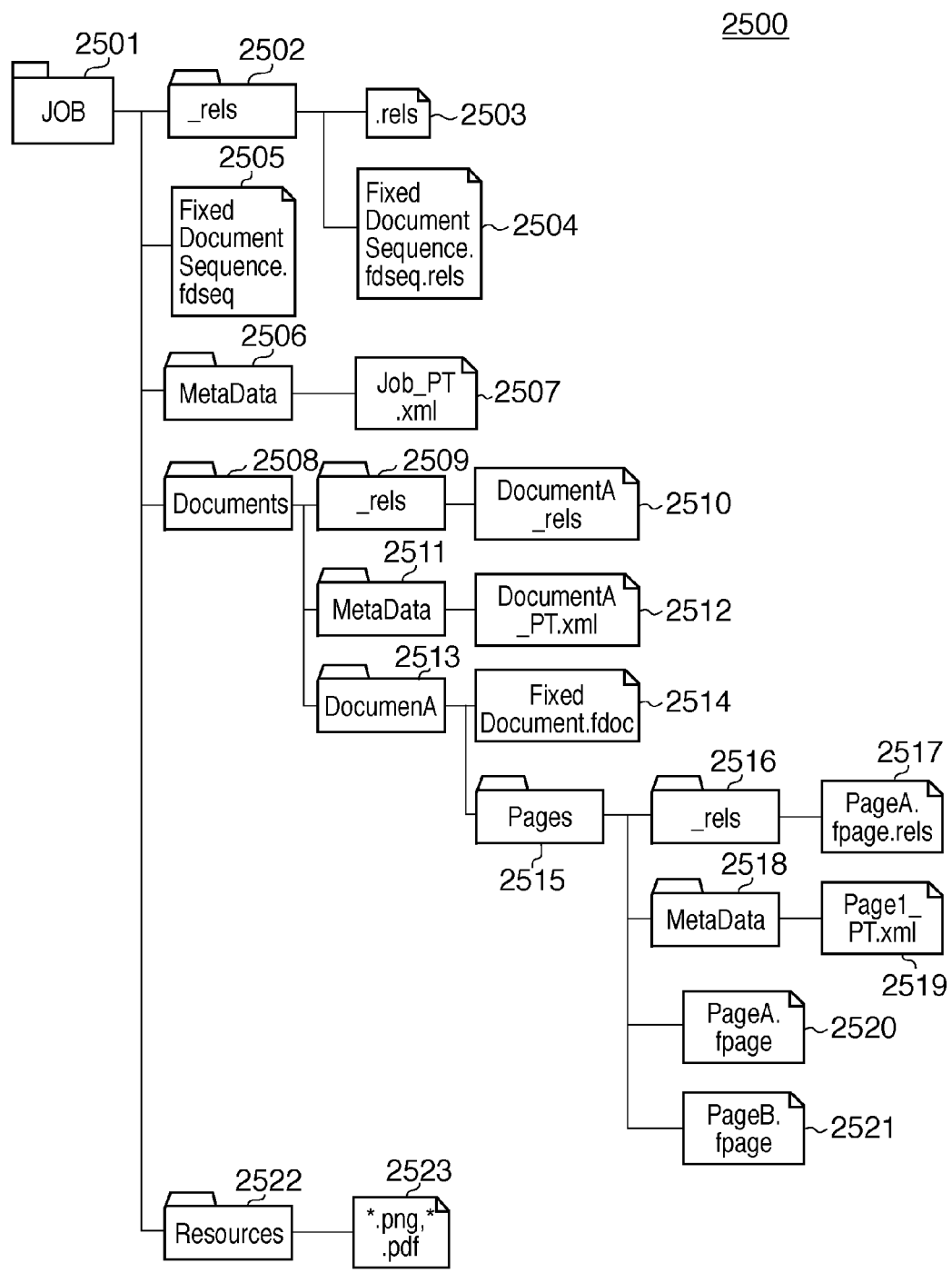
FIG. 25 is a diagram illustrating an example of a structured document handled in the present embodiment.

The document of FIG. 25 is made up of one chapter, DocumentA 2513, and this chapter includes two pages: "PageA.fpage" 2520 and "PageB.fpage" 2521.

A process flow performed by the application to insert the external document 2500 into the structured document 2400 is shown in FIG. 50. In step 5001, the user interface control means 202 of the application program detects the insertion position of the external document and reference information on the external document.

In the next step, step 5002, the network communication means 203 of the application program acquires the external document based on the reference information on the external document.

In the next step, step 5003, the document configuration management means 204 of the application program divides Document1 at the insertion position of the document.

In the next step, step 5004, the document configuration management means 204 of the application program inserts DocumentA, which is a chapter of the external document, into the structured document in accordance with the chapter configuration of the external document.

Finally, in step 5005, the file access means 201 of the application program overwrites and updates the structured document.

Figure 44:
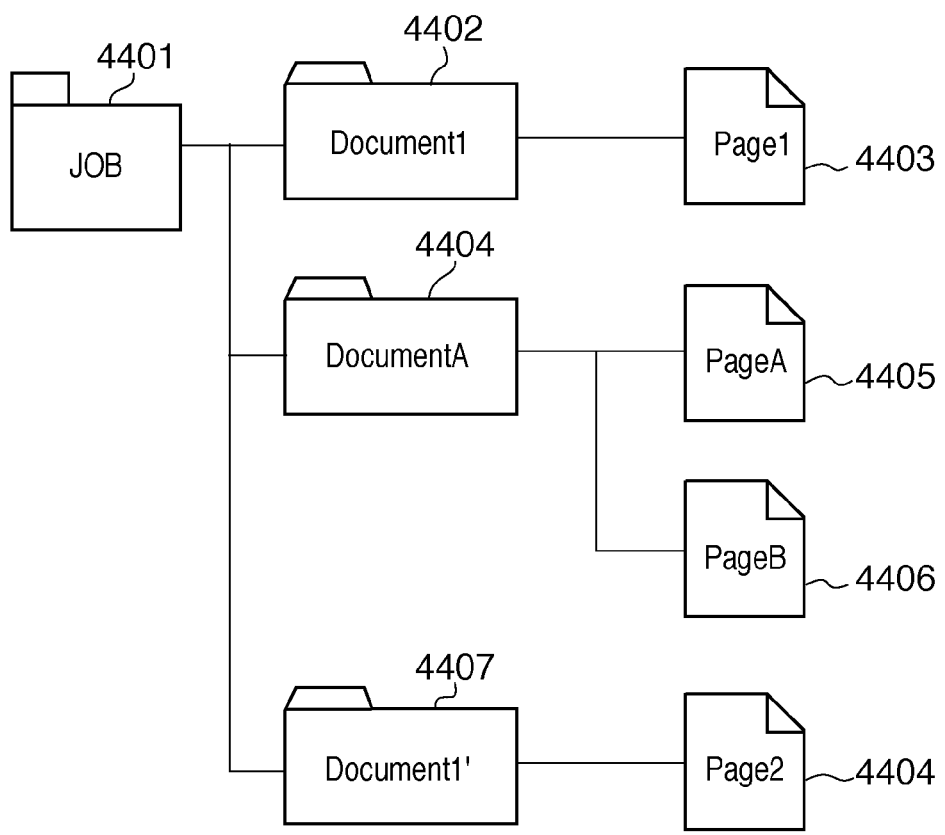
FIG. 44 is a diagram illustrating the concept of a structured document handled in an embodiment of the present invention.

A conceptual diagram of a structured document obtained after the external document of FIG. 25 has been inserted into the structured document of FIG. 24 is shown in FIG. 44. The Document1 4302 is divided by a chapter of the external document inserted between the pages of the Document1 4302. The Document1 is divided into Document1 4402 and Document1' 4407, and DocumentA 4404 is inserted between them.

The structured document obtained after insertion of the external document of FIG. 25 according to the present embodiment will be described in detail with reference to FIG. 26. In the document 2600, the external document was inserted between Page1 2303 and Page2 2304 shown in FIG. 23. Accordingly, Document1 2413 is divided into two to create Document1 2617 and Document1' 2634, and DocumentA 2513 of the external document is inserted between them, which is named as DocumentA 2625.

After editing as described above, "FixedDocumentSequence.fdseq" 2605 is updated. The updated "FixedDocumentSequence.fdseq" is shown in FIG. 38. In FIG. 38, DocumentA is inserted between Document1 and Document1' with DocumentReference tags. Also, "Document1_PT.xml" 2614 and "Document1'_PT.xml" 2616, in which setting information on Document1 2617 and Document1' 2634 is stored, are updated.

The updated "Document1_PT.xml" 2614 is shown in FIG. 28, and the updated "Document1'_PT.xml" 2616 is shown in FIG. 29. In FIGS. 28 and 29, external reference information is stored within a Link tag, and the information on the referenced document of the external document is stored within a Doc tag. Also, order information on the divided document based on the original data is stored with a Sequence tag. In the present embodiment, Sequence=1 is written in FIG. 28, and Sequence=2 is written in FIG. 29, which means that the Document1 2617 is the first and the Document1' 2634 is the second in order.

Figure 26:
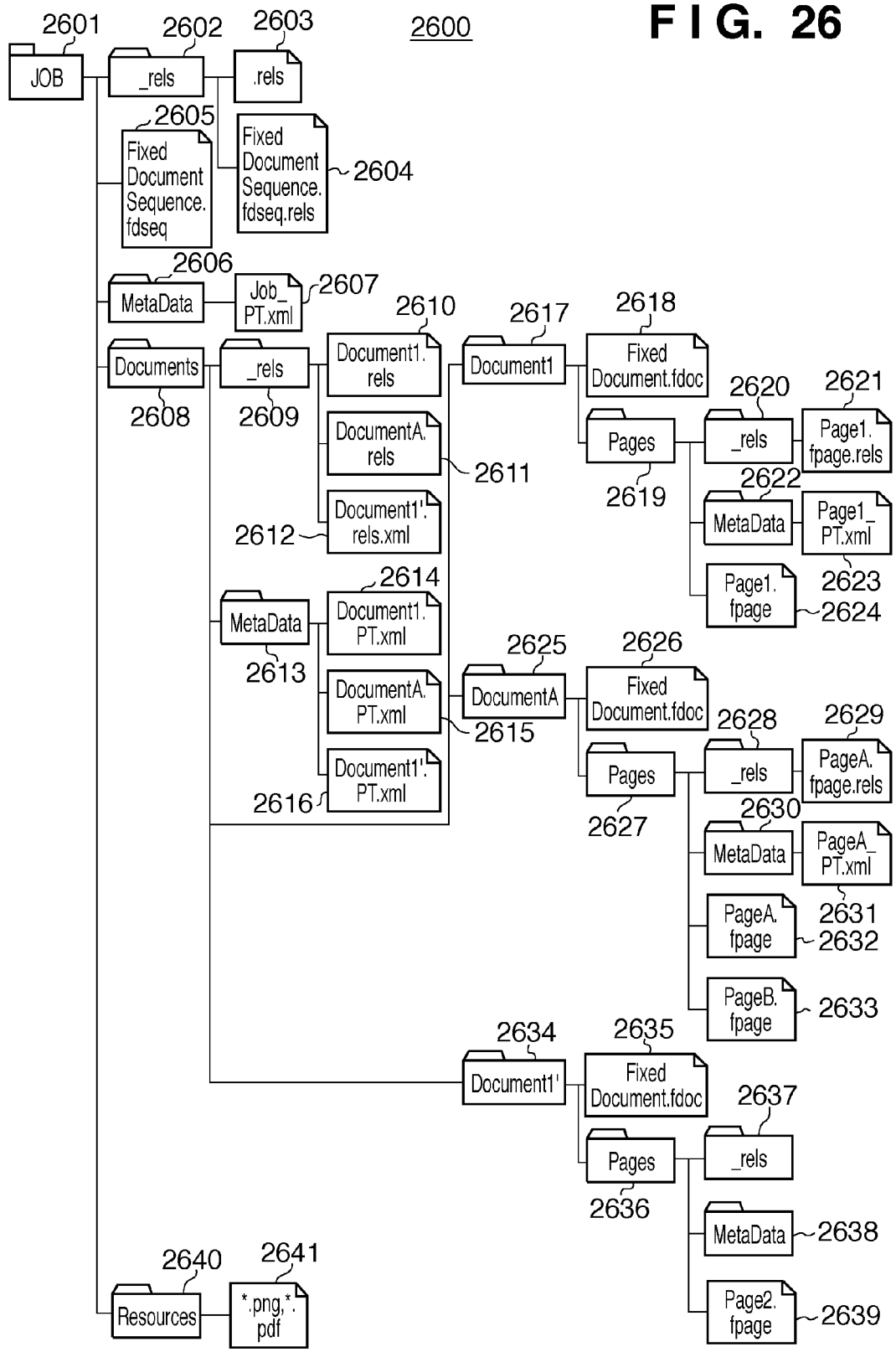
FIG. 26 is a diagram illustrating an example of a structured document handled in the present embodiment.

FIG. 32 shows an example in which the document of FIG. 26 is displayed on the application. The Job 2601, which is a document root of FIG. 26, is displayed as Job 3201. Also, under Job 3201, Document1 3202, DocumentA 3204 and Document1' 3207 are enumerated in accordance with the configuration information written in "FixedDocumentSequence.fdseq" 2605.

In FIG. 32, when Document1 3202, Document1' 3207, or both Document1 3202 and Document1' 3207 are selected, and a right click is performed with the mouse, a menu in which "Re-acquire" and "Update Original" are shown is displayed.

Figure 33:
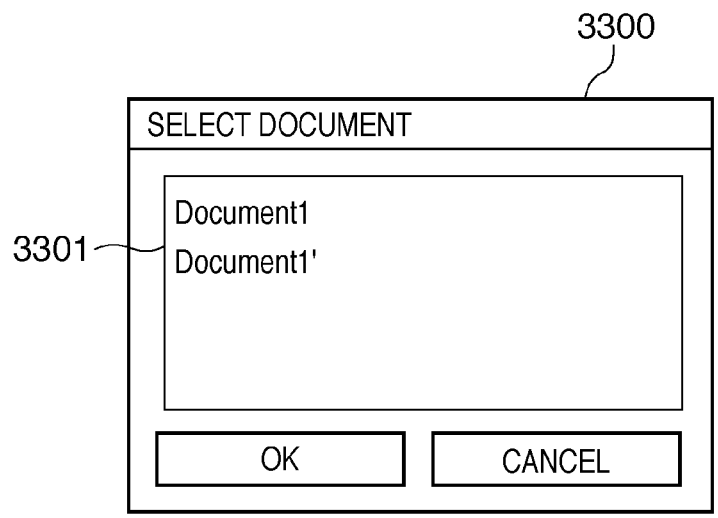
FIG. 33 is a diagram used to illustrate an example of a UI of an application program according to an embodiment of the present invention.

A UI displayed when "Re-acquire" is pressed is shown in FIG. 33. In FIG. 33, the location where an acquired external document is arranged can be selected.

In a document selection screen 3301, the Document1 2617 and the Document1' 2634 associated with the external document are enumerated. A document selected from that list is overwritten with the external document, and other documents associated with the external document are deleted. With this configuration, it becomes possible to re-acquire an external document even after the document has been divided.

On the other hand, when "Update Original" is pressed in FIG. 32, the Document1 2617 and the Document1' 2634 are uploaded to the external document in accordance with the information in FIGS. 28 and 29. At this time, the Document1 2617 and the Document1' 2634 are uploaded to the Doc of the external document in accordance with the Doc information in FIGS. 28 and 29. In addition, the pages of the Document1 2617 and the Document1' 2634 are ordered in accordance with the Sequence information in FIGS. 28 and 29. Then, the XML of "FixedDocument.fdoc" 2618 and "FixedDocument.fdoc" 2635 are merged in accordance with the order specified in the Sequence tag of FIGS. 28 and 29, and uploaded to "FixedDocument.fdoc" 2514 of the external document 2500.

Alternatively, "Document1_PT.xml" 2614, "Document1'_PT.xml" 2616, or both "Document1_PT.xml" 2614 and "Document1'_PT.xml" 2616 may be merged into and uploaded to the "Document1_pt.xml" 2512 of the external document 2500, or it is also possible to prompt the user to set these.

Figure 34:
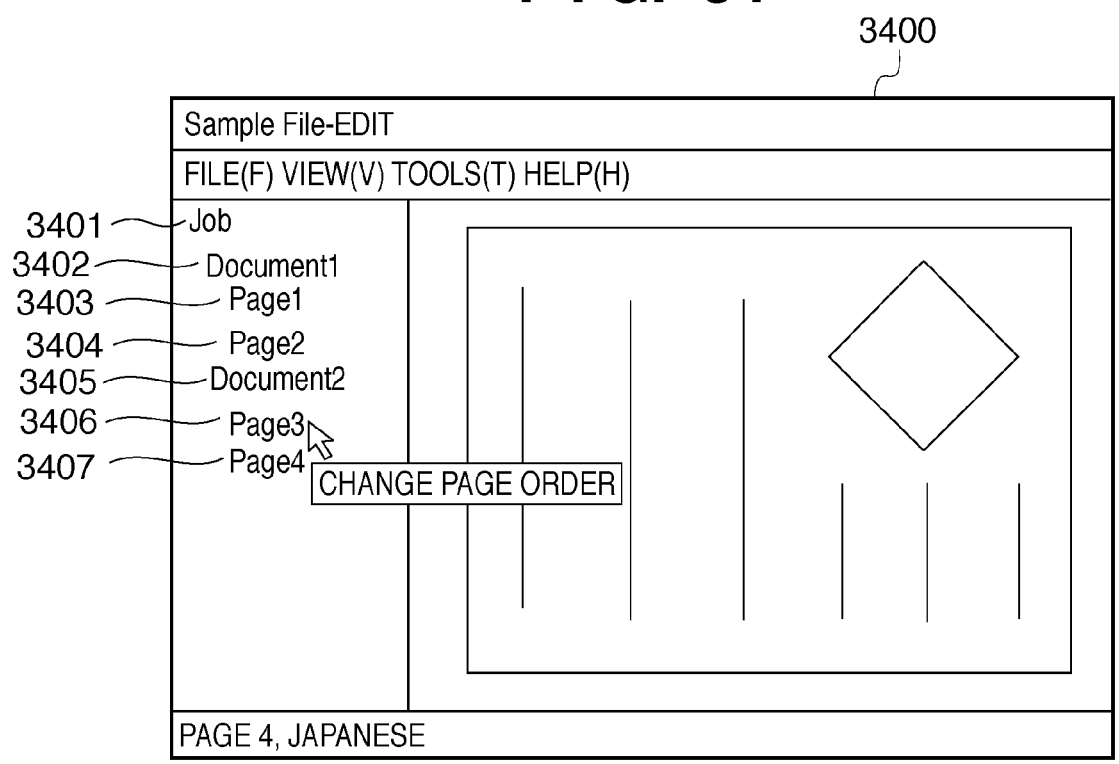
FIG. 34 is a diagram used to illustrate an example of a UI of an application program according to an embodiment of the present invention.

Next is a description of a case in which the page order of the structured document of FIG. 3 is changed using the application. A UI of the application displayed when the page order is changed is shown in FIG. 34.

Figure 51:
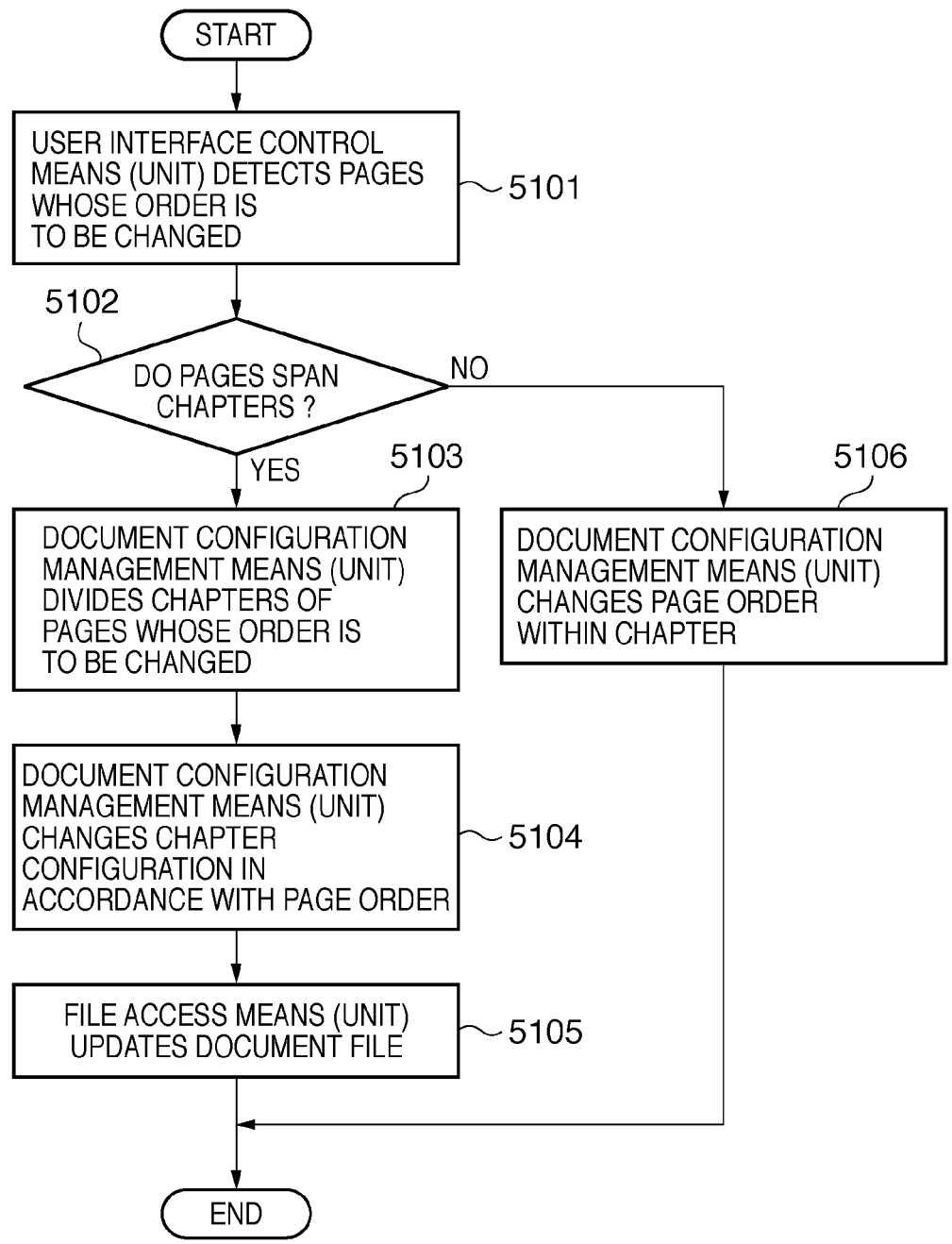
FIG. 51 is a diagram illustrating a process flow of an application program according to an embodiment of the present invention.

In the left pane of a UI 3400 of the application, Page2 3404 of Document1 3402 and Page3 3406 of Document2 3405 are selected, a right click is performed with the mouse, and "Change Page Order" is selected from the menu. FIG. 51 shows a process flow performed to change the page order of the structured document 300.

In step 5101, the user interface control means 202 of the application program detects (identifies) pages whose order is to be changed.

In step 5102, the document configuration management means 204 of the application program determines whether the pages whose order is to be changed belong to different chapters.

If the pages belong to different chapters, in step 5103, the document configuration management means 204 of the application program divides the chapters of the pages whose order is to be changed. Then, in step 5104, the document configuration management means 204 changes the chapter configuration to change the page order.

If it is determined in step 5102 that the pages whose order is to be changed belong to the same chapter, in step 5106, the page order is changed within the chapter.

Finally, in step 5105, the file access means 201 of the application program overwrites and updates the structured document.

Figure 35:
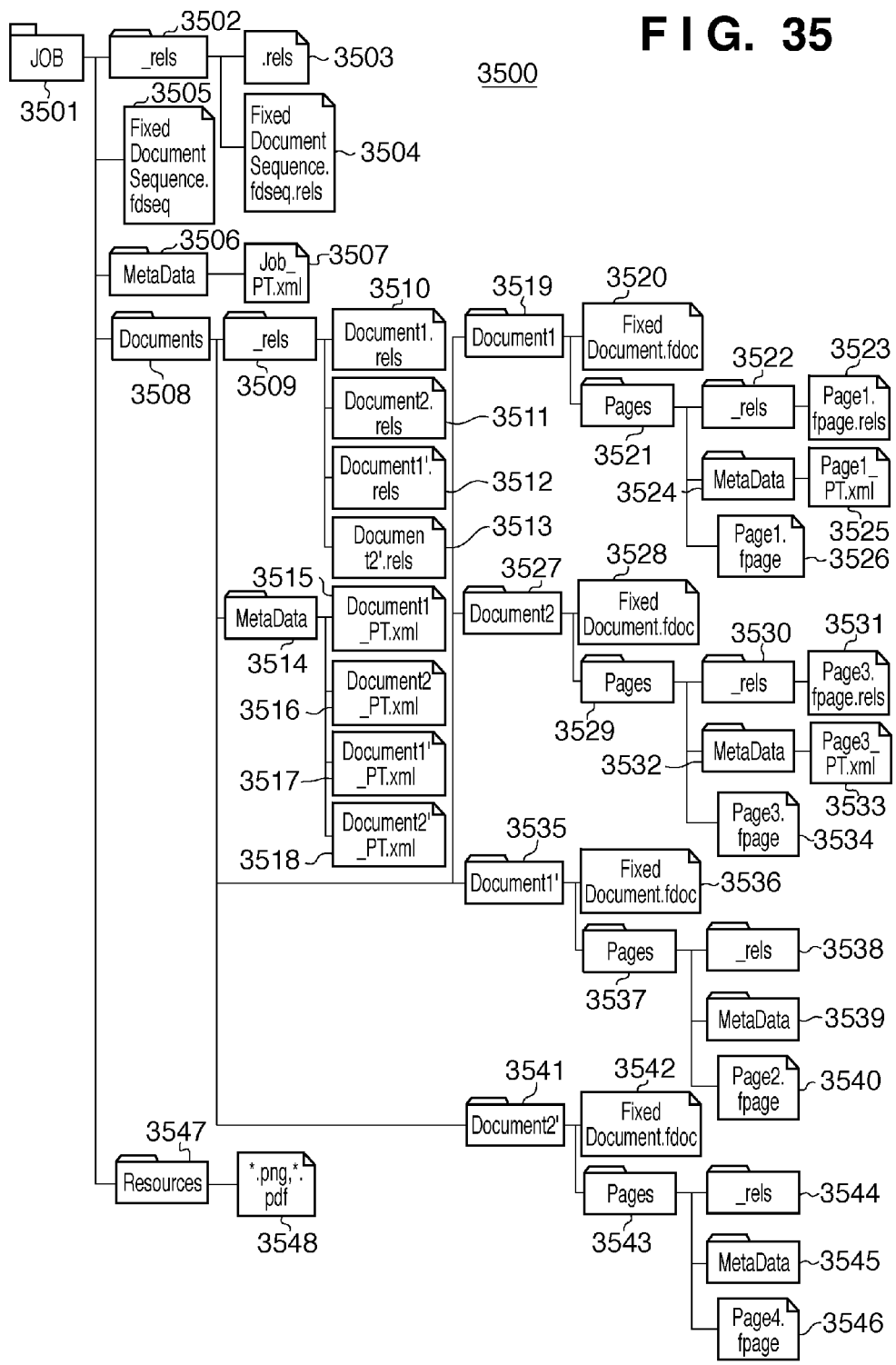
FIG. 35 is a diagram illustrating an example of a structured document handled in the present embodiment.

A document configuration after changing the page order is shown in FIG. 35. In the document 3500, the Document1 315 and the Document2 324 were divided due to a change in page order. Accordingly, the Document1 315 is divided into Document1 3519 and Document1' 3535, and the Document2 324 is divided into Document2 3527 and Document2' 3541.

Figure 45:
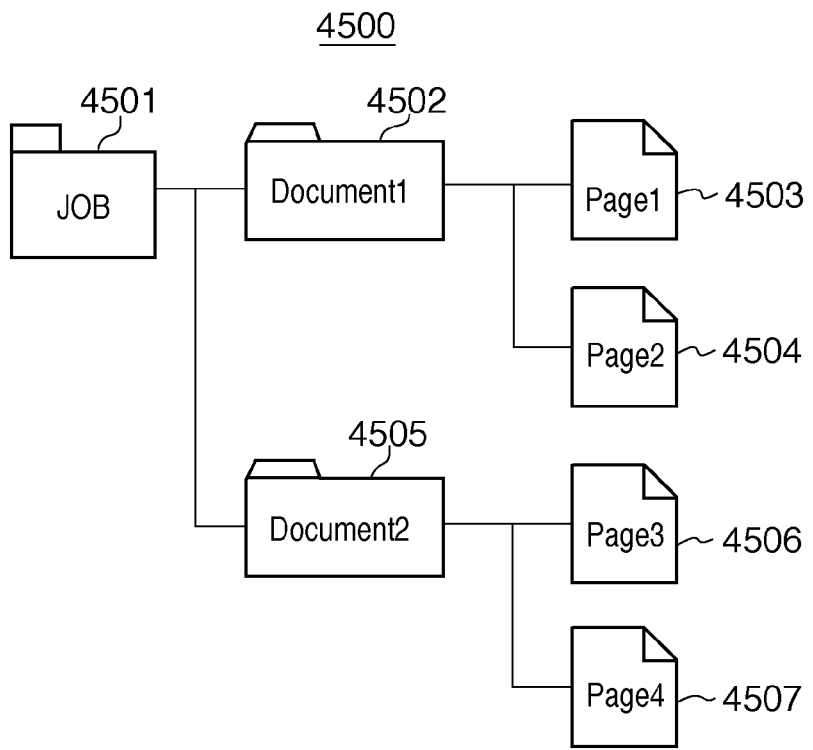
FIG. 45 is a diagram illustrating the concept of a structured document handled in an embodiment of the present invention.
Figure 46:
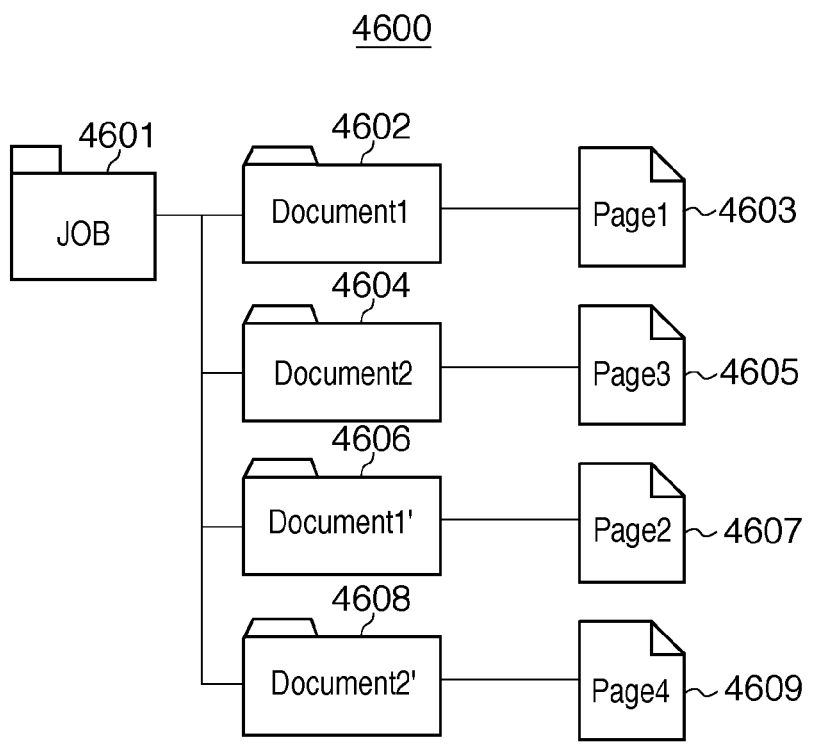
FIG. 46 is a diagram illustrating the concept of a structured document handled in an embodiment of the present invention.

Also, "FixedDocumentSequence.fdseq" 3505 is updated according to the change in document configuration. FIG. 36 shows the updated "FixedDocumentSequence.fdseq". The document configuration after changing the page order is written by enumerating Document1, Document2, Document1', and Document2' in this order with DocumentReference tags. "Document1.rels" file 3510 and "Document2.rels" file 3511 are copied to "Document1'.rels" file 3512 and "Document2'.rels" file 3513. Likewise, "Document1_PT.xml" file 3515 and "Document2_PT.xml" file 3516 are copied to "Document1'_PT.xml" file 3517 and "Document2' PT.xml" file 3518. The configurations of this document before and after editing are shown in FIGS. 45 and 46, respectively. There were two chapters, namely, Document1 and Document2 before editing, but after editing, the pages are reconfigured to be independent of each other, and rearranged in accordance with the changed page order.

Page order change in a structured document according to another embodiment will be described. FIG. 52 shows a structured document before the page order is changed. This document includes Job 5201 as a root, and is made up of Document1 5202 and Document2 5206, each chapter including three pages.

Figure 54:
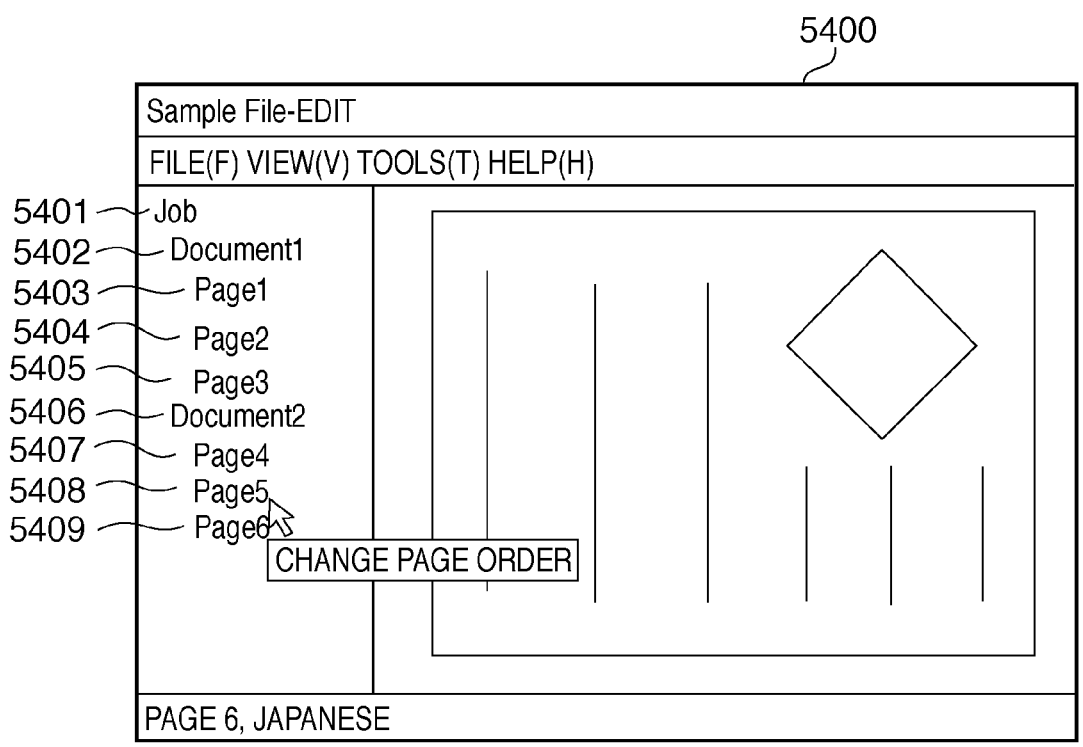
FIG. 54 is a diagram used to illustrate an example of a UI of an application program according to an embodiment of the present invention.

A UI displayed when the document is edited with the application program of the present invention is shown in FIG. 54. In FIG. 54, Page2 5404 and Page5 5408 are selected, a right-click is performed with the mouse, and "Change page order" is selected from the menu. A document configuration obtained after page order change has been performed on the document with the application program of the present invention in accordance with the process flow of FIG. 51 is shown in FIG. 53. Because the page order of Page5 5305 and Page2 5311 was changed, the chapters are divided by these pages, creating Document2' 5308 and Document1' 5306. Also, in Document1, the page order does not change after Page2 whose order is changed. Accordingly, Document1" 5310 is created. Likewise, in Document2, Document2" 5312 is created in order to arrange the pages after Page5.

As described above, when a component document (i.e., chapter) is edited and divided, and then part of the divided document is selected and an instruction to reflect it in the original document (original document data) is issued, the following is performed so as to have it reflected. For example, when the selected chapter is a chapter divided from an original chapter, an external document corresponding to the chapter is identified based on the reference information. Then, the identified external document is read, and the corresponding part of the external document is overwritten with only the part included in the selected chapter. This is of course merely an example.

In the manner as described above, the merged document can be edited. In addition, after editing the document configuration, the edits made to the document, such as deletion, order change or addition on a page-by-page basis or a chapter-by-chapter basis, can be reflected in the original document before merging. Consequently, the task of updating the document can be eliminated, resulting in efficient document management.

The above embodiment discussed the case in which an external original document is inserted into a document to be edited, but it is also possible to replace a selected component document, such as a chapter or page, with an external document. In such a case, the external document is inserted into the position of the component document to be replaced, and then the component document to be replaced is deleted. As for the reference information, it is stored in the edited document in the same manner as the above-described example.

Note that the present invention may be applied to a system comprising a plurality of devices (for example, a host computer, an interface device, a reader, a printer, and so on), or to an apparatus comprising a single device (for example, a copy machine, a facsimile apparatus, and so on). Furthermore, the object of the present invention can also be achieved by supplying, to a system or apparatus, a recording medium in which a program that realizes the functions of the above-described embodiment has been recorded, and causing a computer of the system or apparatus to read out and execute the program stored in the recording medium. In such a case, the program read out from the recording medium realizes the functions of the above-described embodiment, and the program itself and the recording medium in which the program is stored constitute the present invention.

Moreover, the present invention also encompasses the case where an operating system (OS) or the like running on a computer performs part or all of the actual processing based on instructions in the program, and the functions of the above-mentioned embodiment are realized by that processing. The present invention is also applied to the case where the program read out from the recording medium is written in a memory included in a function expansion card inserted in a computer or a function expansion unit connected to the computer. In such a case, a CPU or the like provided in the function expansion card or the function expansion unit performs part or all of the actual processing based on the instructions of the written program, and the functions of the above-described embodiment are realized by that processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-120770, filed on May 2, 2008, which is hereby incorporated by reference herein in its entirety.

What is claimed is:

1. A document processing apparatus, comprising:
one or more memory devices storing one or more computer-executable programs; and
one or more processors coupled to the one or more memory devices and configured to execute the one or more computer-executable programs at least to:
access an external document and a structured document stored in memory, wherein the external document is separate from the structured document;
insert the external document into a chapter of the structured document while maintaining a hierarchical structure of the external document,
wherein the structured document comprises a job folder, a print ticket, and a reference link referring to a storage location of the external document,
wherein the job folder comprises a document folder, and
wherein the document folder includes a page folder;
change the inserted external document that is at least a portion of the structured document; and
update, based on the reference link, the separate external document to reflect the change to the inserted external document that is at least the portion of the structured document.

2. The apparatus according to claim 1, wherein the one or more processors are configured by the one or more programs at least to divide a first chapter of the structured document into two parts and to insert the separate external document between the two parts.

3. A document processing method performed at least by a computer of a document processing apparatus, the method comprising:
an accessing step of accessing an external document and a structured document stored in memory, wherein the external document is separate from the structured document;
an inserting step of inserting the external document into a chapter of the structured document while maintaining a hierarchical structure of the external document,
wherein the structured document comprises a job folder, a print ticket, and a reference link referring to a storage location of the external document,
wherein the job folder comprises a document folder, and
wherein the document folder includes a page folder;
a changing step of changing the inserted external document that is at least a portion of the structured document; and
an updating step of updating, based on the reference link, the separate external document to reflect the change to the inserted external document that is at least the portion of the structured document.

4. The method according to claim 3, wherein, in the changing step, a first chapter of the structured document is divided into two parts and the separate external document is inserted between the two parts.

5. A non-transitory medium in which a program is recorded that is executable at least by a computer of a document processing apparatus, the program comprising:

accessing instructions configured to access an external document and a structured document stored in memory, wherein the external document is separate from the structured document;

inserting instructions configured to insert the external document into a chapter of the structured document while maintaining a hierarchical structure of the external document, wherein the structured document comprises a job folder, a print ticket, and a reference link referring to a storage location of the external document, wherein the job folder comprises a document folder, and wherein the document folder includes a page folder;

changing instructions configured to change the inserted external document that is at least a portion of the structured document; and updating instructions configured to update, based on the reference link, the separate external document to reflect the change to the inserted external document that is at least the portion of the structured document.

6. The medium according to claim 5, wherein the changing instructions are configured to divide a first chapter of the structured document into two parts and to insert the separate external document between the two parts.

\* \* \* \* \*